US012626466B2

(12) United States Patent
Mason

(10) Patent No.: US 12,626,466 B2
(45) Date of Patent: May 12, 2026

(54) SYSTEMS AND METHODS FOR HANDLING BEVELS IN MESH SIMPLIFICATION

(71) Applicant: Electronic Arts Inc., Redwood City, CA (US)

(72) Inventor: Ashton Mason, Brighton (GB)

(73) Assignee: Electronic Arts Inc., Redwood City, CA (US)

( * ) Notice: Subject to any disclaimer, the term of this patent is extended or adjusted under 35 U.S.C. 154(b) by 186 days.

(21) Appl. No.: 18/407,897

(22) Filed: Jan. 9, 2024

(65) Prior Publication Data

US 2025/0225731 A1    Jul. 10, 2025

(51) Int. Cl.
*G06T 17/20* (2006.01)

(52) U.S. Cl.
CPC .................................. *G06T 17/205* (2013.01)

(58) Field of Classification Search
CPC .............................. G06T 17/205; G06T 17/20
See application file for complete search history.

(56) References Cited

U.S. PATENT DOCUMENTS

2016/0246897 A1* 8/2016 Kannan .................... G06F 30/00
2017/0046874 A1* 2/2017 Mason .................... G06T 17/205
2017/0169608 A1* 6/2017 Starhill .................... G06T 15/04

OTHER PUBLICATIONS

Giniaux: Mesh decimation done right [online] [Retrieved Aug. 25, 2025] <URL: https://odgy.medium.com/mesh-decimation-done-right-95245c4b5f52> (Year: 2021).*
Forum post from user named "MaximumADHD" [online] [Retrieved Aug. 25, 2025] <URL: https://devforum.roblox.com/t/what-are-you-working-on-currently-2019/218270/1303?page=63> (Year: 2019).*
Blender Foundation: Bevel Edges [online] [Retrieved Aug. 28, 2025]<https://web.archive.org/web/20201030110240/https://docs.blender.org/manual/en/latest/modeling/meshes/editing/edge/bevel.html> (Year: 2020).*
Mason, Ashton. "Quad mesh simplification in Frostbite," Game Developers Conference (GDC) 2020, Slides and Transcript (Aug. 11, 2020) (available at: https://www.youtube.com/watch?v=vBJcdClynFE), from Applicant's IDS (Year: 2020).*

(Continued)

*Primary Examiner* — King Y Poon
*Assistant Examiner* — Vincent Alexander Providence
(74) *Attorney, Agent, or Firm* — Leydig, Voit & Mayer, Ltd.

(57) ABSTRACT

A method, device, and computer-readable storage medium for simplifying a mesh including bevels. The method includes: receiving a polygonal mesh representing a three-dimensional (3D) object; identifying a set of edges in the polygonal mesh as bevel edges; performing a mesh simplification operation on the polygonal mesh to generate a simplified mesh, wherein the mesh simplification operation removes at least one edge that includes a vertex that is of a bevel edge, and wherein two vertices in the polygonal mesh are collapsed to a collapse vertex in the simplified mesh; and updating stored normals of the collapse vertex based on copying stored normals of the two vertices removed from the polygonal mesh to the collapse vertex.

18 Claims, 16 Drawing Sheets

(56) References Cited

OTHER PUBLICATIONS

Garland et al. "Surface Simplification Using Quadric Error Metrics," Proceedings of the ACM SIGGRAPH Conference on Computer Graphics, pp. 1-8 (1997) (available at: https://www.ri.cmu.edu/pub_files/pub2/garland_michael_1997_1/garland_michael_1997_1. pdf).

Daniels et al. "Quadrilateral mesh simplification," ACM SIGGRAPH Asia 2008 Papers, SIGGRAPH Asia 2008, Singapore, Singapore (Dec. 10-13, 2008) (available at: https://www.sci.utah.edu/~csilva/papers/siggraph-asia2008.pdf).

Mason, Ashton. "Quad mesh simplification in Frostbite," Game Developers Conference (GDC) 2020, Slides and Transcript (Aug. 11, 2020) (available at: https://www.youtube.com/watch?v=vBJcdClynFE).

* cited by examiner

100 —

700

802C

802B

802A

800

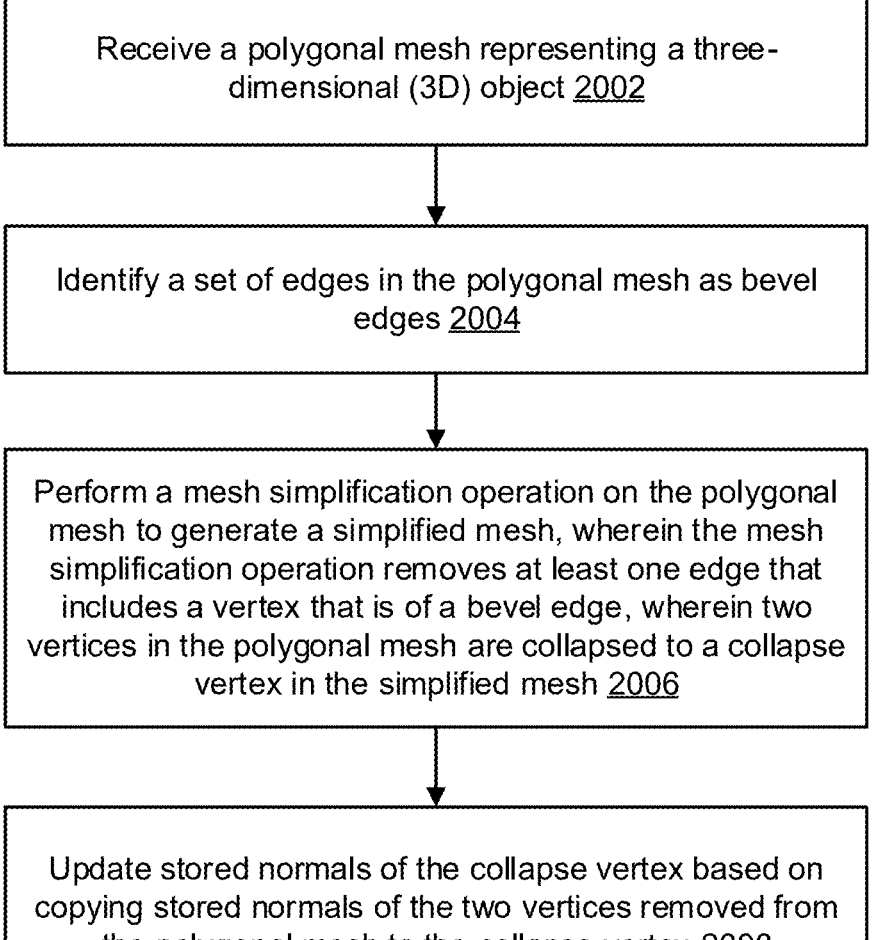

Receive a polygonal mesh representing a three-dimensional (3D) object 2002

Identify a set of edges in the polygonal mesh as bevel edges 2004

Perform a mesh simplification operation on the polygonal mesh to generate a simplified mesh, wherein the mesh simplification operation removes at least one edge that includes a vertex that is of a bevel edge, wherein two vertices in the polygonal mesh are collapsed to a collapse vertex in the simplified mesh 2006

Update stored normals of the collapse vertex based on copying stored normals of the two vertices removed from the polygonal mesh to the collapse vertex 2008

FIG. 20

SYSTEMS AND METHODS FOR HANDLING BEVELS IN MESH SIMPLIFICATION

FIELD

This disclosure generally relates to computer graphics and, more particularly, to systems and methods for handling bevels in mesh simplification.

BACKGROUND

For three-dimensional (3D) graphics applications, such as video games or animated films, efficient processing of data by reducing computational complexity of a given operation is often useful. This is particularly the case in real-time applications, such as video games.

Various operations can be performed using computer generated objects in a scene. An object may be represented as a polygonal mesh, which comprises a collection of vertices, edges, and faces that define the shape and/or boundary of the object.

One technique to reduce the computational complexity of a given graphics operation involving a 3D object is to use a lower complexity stand-in for the 3D object. For 3D objects that comprise a polygonal mesh, mesh simplification can be performed on the 3D object to produce simplified versions of the polygonal mesh called Levels of Detail (LODs). For example, a LOD can be used as a stand-in for the original (full resolution model) in-game when the modelled 3D object is far from the camera and thus small on screen.

Polygonal meshes can be simplified by edge collapse to generate LODs, where an edge in a mesh is replaced with a single vertex in the simplified mesh. Some mesh simplification methods collapse single edges at each pass. Other mesh simplification methods collapse multiple edges at once in what is called polychord collapse, allowing the simplified mesh to preserve the grid-like topology of semi-regular quad mesh models that are often used in games.

Many artist-authored models contain a modelling trick called bevels, in which a strip of narrow faces is inserted between the faces of adjacent large, flat surfaces, to cheaply create the visual impression of a curved edge that would otherwise take many small faces to approximate. Because these bevel faces are typically smooth-shaded (yet act as proxies for what would otherwise have been hard edges), when bevels are collapsed using conventional approaches, shading artifacts can be introduced where the curved normals of the bevel face bleed onto the adjacent flat surfaces, making them appear curved.

Accordingly, there remains a need in the art for an improved system and method for generating simplified meshes that can properly handle bevels without introducing artifacts.

SUMMARY

Embodiments of the disclosure provide a method, device, and computer-readable storage medium for simplifying a mesh including bevels. The method includes: receiving a polygonal mesh representing a three-dimensional (3D) object; identifying a set of edges in the polygonal mesh as bevel edges; performing a mesh simplification operation on the polygonal mesh to generate a simplified mesh, wherein the mesh simplification operation removes at least one edge that includes a vertex that is of a bevel edge, and wherein two vertices in the polygonal mesh are collapsed to a collapse vertex in the simplified mesh; and updating stored normals of the collapse vertex based on copying stored normals of the two vertices removed from the polygonal mesh to the collapse vertex.

BRIEF DESCRIPTION OF THE DRAWINGS

FIG. 20 is a flow diagram of method steps for simplifying a mesh including bevels, according to one embodiment.

DETAILED DESCRIPTION

Figure 1:
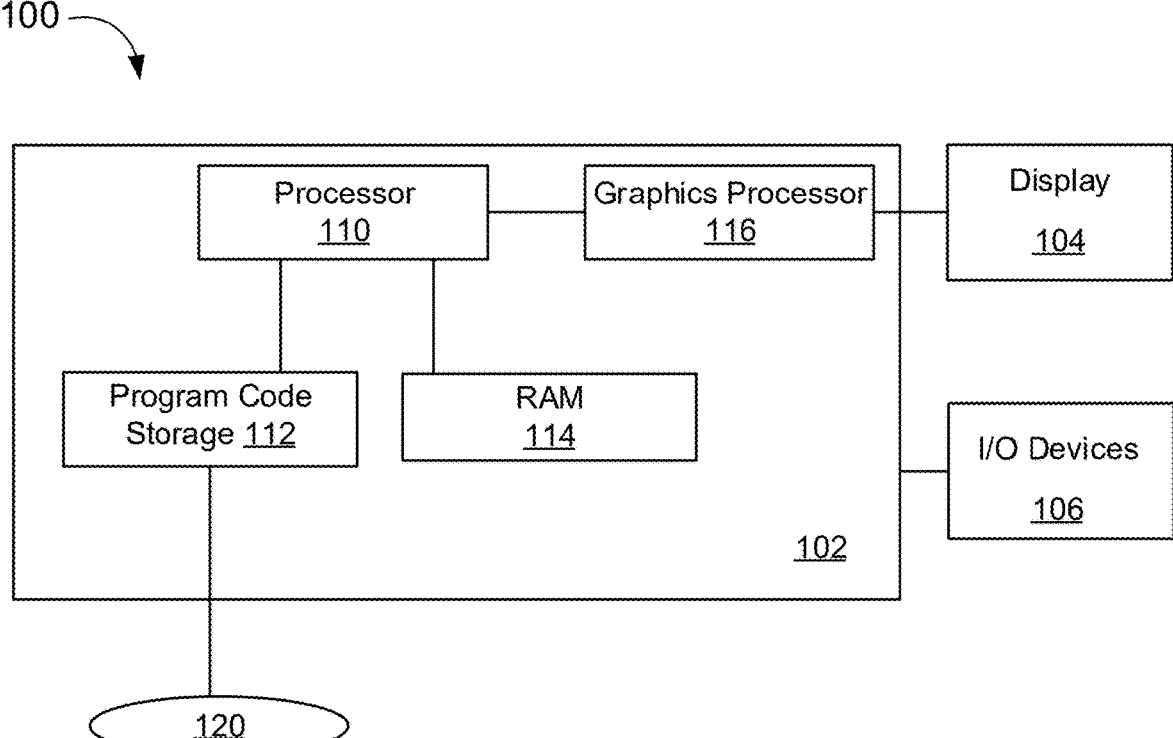
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a system and method for handling the collapse of bevels during simplification of polygonal meshes. In particular, some embodiments of the disclosure automatically harden edges left over when bevels are collapsed. Some embodiments detect edge collapses that will collapse bevels, and explicitly introduce hard-shaded edges in order to avoid bleeding of normals from the collapsed bevel onto neighboring flat surfaces. In some implementations, the disclosed embodiments are poly-chord-aware and can update normals around complex collapses that collapse multiple edges at once, such as when collapsing entire bevel faces.

Some embodiments of the disclosure rely on detecting bevels in artist-authored polygonal meshes. While bevels are typically inserted intentionally to achieve a specific effect, no workflow currently exists by which artists can mark-up inserted bevels, allowing the tool to easily recognize them. Thus, when bevel edges are not explicitly known to be bevel edges, some embodiments of the disclosure detect bevels using filtering. In one embodiment, bevels are detected based on thresholds on the sizes and normal angles across adjacent faces using a suite of patterns targeted at bevels of different degree based on their regularity. The aim is to capture as many real bevels as possible without introducing false positives and so incorrectly hardening edges in areas of the polygonal mesh that are intended to be smooth.

As described, a three-dimensional (3D) asset, such as a vehicle or a building in a game, includes a main graphics mesh hand-authored by an artist, plus a number of secondary meshes that are used for a variety of other purposes. These secondary meshes are often specialized or simplified versions of the primary graphics mesh. A classic example of secondary meshes are level-of-detail (LOD) meshes, which are simplified versions of the primary graphics mesh, with successively fewer triangles, used as stand-ins for the primary mesh when the model is far away.

In some implementations, to generate the LODs, a series of simplified versions of an input polygonal mesh are generated. The simplified versions can be generated using a variety of mesh simplification techniques in which individual edges of the mesh are collapsed iteratively to successively reduce the triangle count of the polygonal mesh. When an edge is collapsed, the edge is replaced with a single vertex, and any incident faces are updated accordingly. The vertex is placed so as to optimally approximate the original geometry in the patch of surrounding faces.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=$\frac{1}{60}$ seconds.

In some cases, a frame might represent the scene from t=0 seconds to t=$\frac{1}{60}$ seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
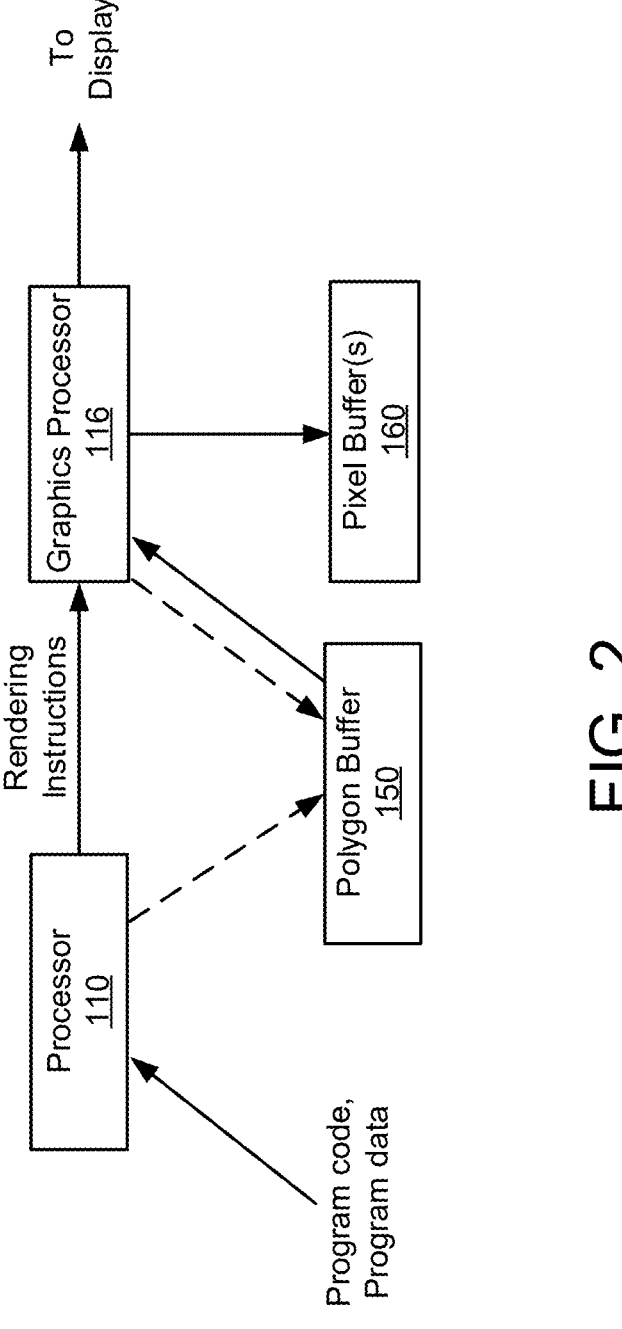
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
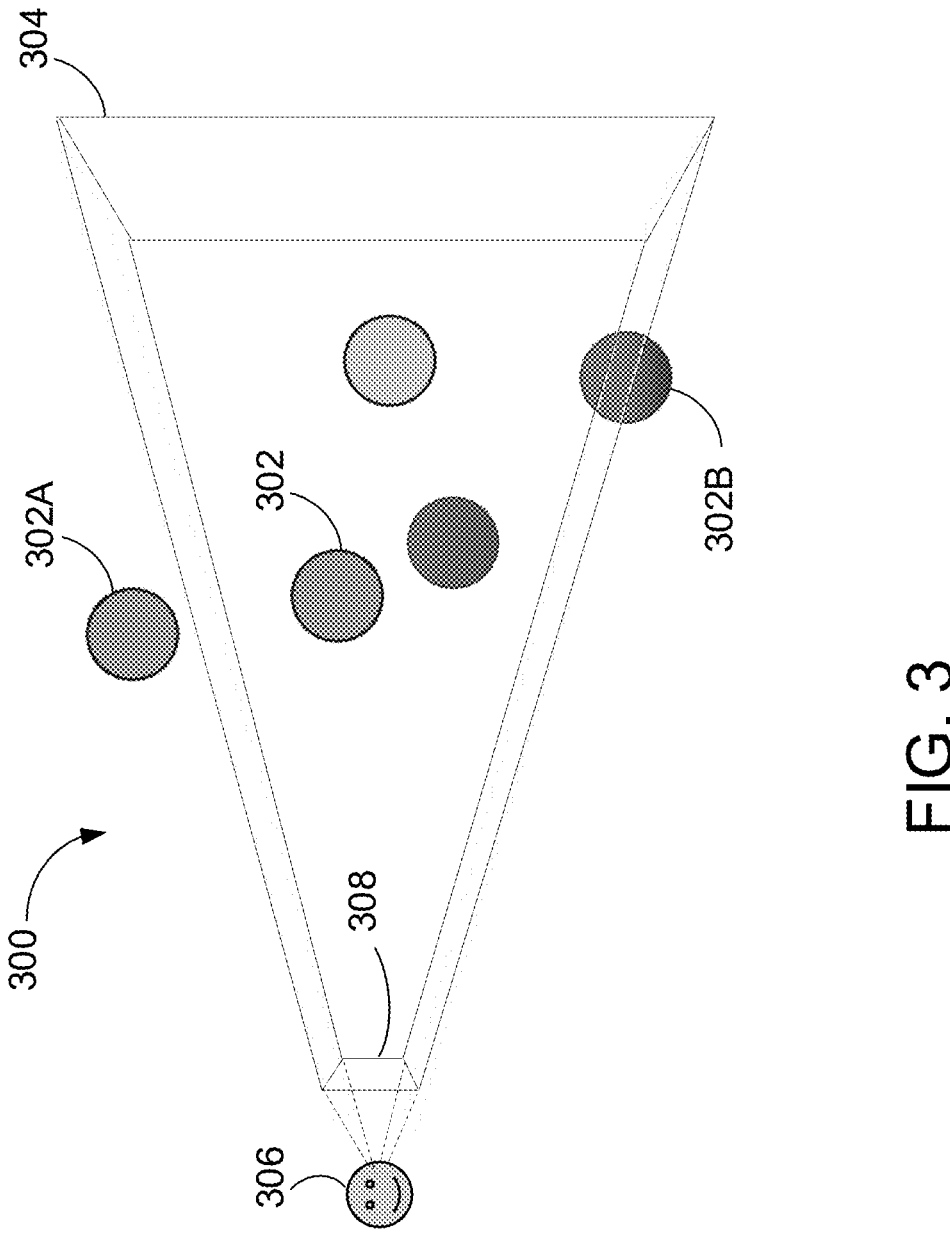
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
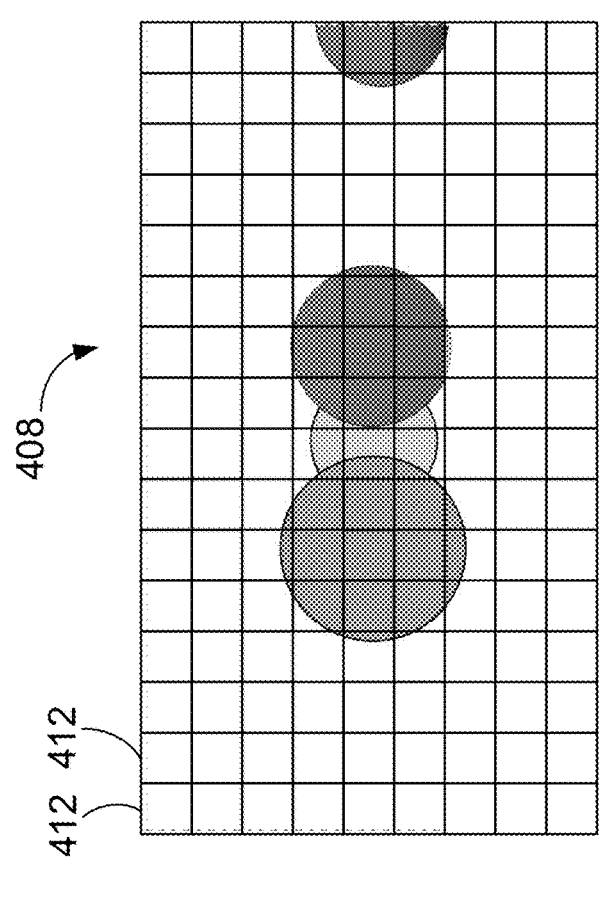
FIG. 4B is an example of an image of a scene, according to one embodiment.
Figure 4A:
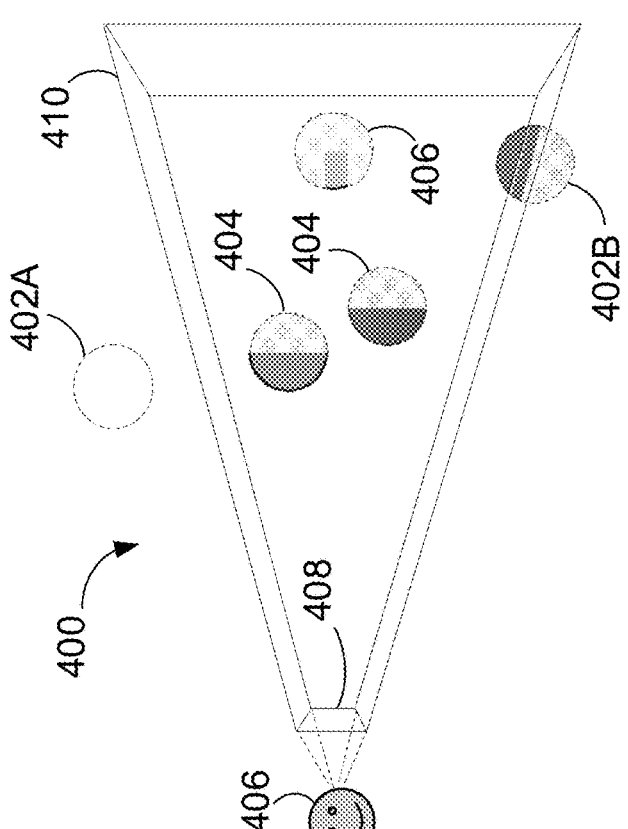
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figures 5, 6:
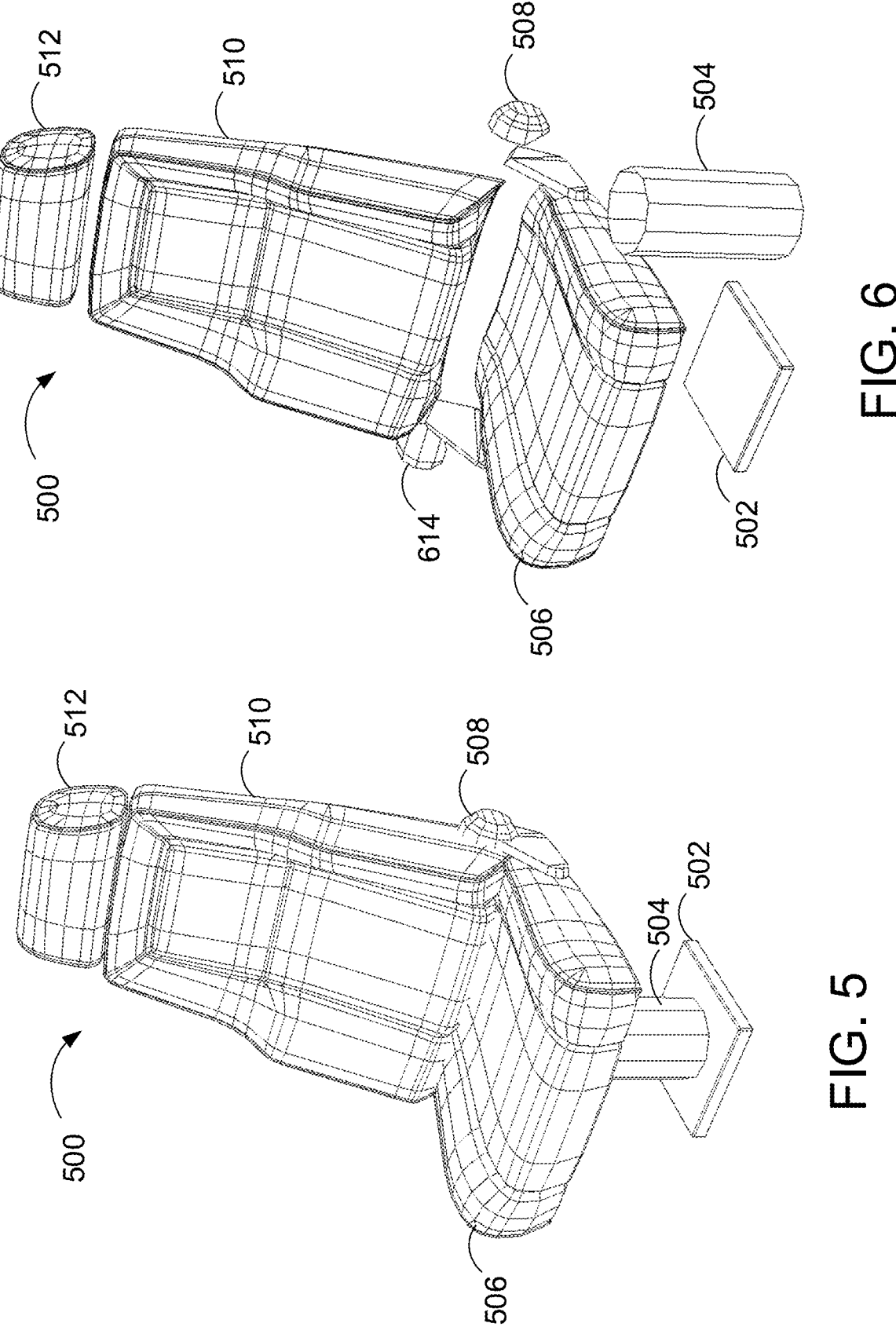
FIG. 5 is an example of a polygonal mesh, according to one embodiment.
FIG. 6 is an exploded view of the object defined by the polygonal mesh shown in FIG. 5, according to one embodiment.

FIG. 5 is an example of a polygonal mesh 500, according to one embodiment. As described, the polygonal mesh 500 is a graphics mesh may correspond to an artist-authored object. In the example shown, the object represents a chair. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In various embodiments, the polygonal mesh 500 may be comprised of one or more polygonal sub-meshes, also called "components." Each sub-mesh may include a series of polygons. In the example shown in FIG. 5, the polygonal mesh is comprised of multiple sub-meshes 502, 504, 506, 508, 510, 512, where sub-mesh 502 represents a chair base, sub-mesh 504 represents a chair post, sub-mesh 506 represents a chair seat, sub-mesh 508 represents a chair handle, sub-mesh 510 represents a chair back, and sub-mesh 512 represents a chair headrest.

FIG. 6 is an exploded view of the object defined by the polygonal mesh 500 shown in FIG. 5, according to one embodiment. The multiple sub-meshes or components are shown in FIG. 6, including sub-mesh 502 that represents a chair base, sub-mesh 504 that represents a chair post, sub-mesh 506 that represents a chair seat, sub-mesh 508 that represents a chair handle, sub-mesh 510 that represents a chair back, and sub-mesh 512 that represents a chair headrest. Also shown in FIG. 6 is a sub-mesh 614 that represents a second chair handle that is not visible in the perspective view shown in FIG. 5, as the second chair handle is occluded by the chair seat and chair back in FIG. 5.

As described above, one or more simplified polygonal meshes, or LODs, can be generated that represent the polygonal mesh 500 to be used in operations to reduce the computational complexity of the operations.

Figure 7:
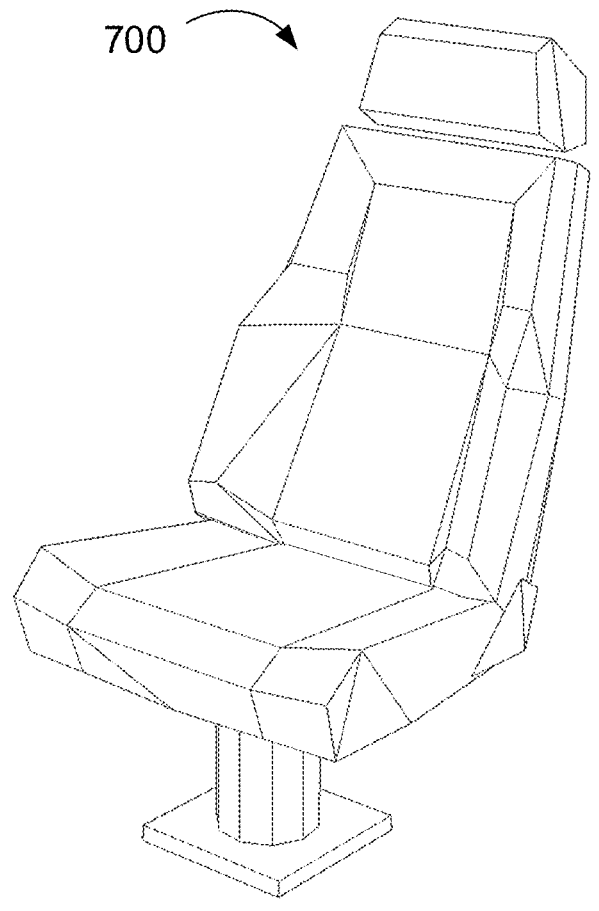
FIG. 7 is an example of a level-of-detail mesh corresponding to the polygonal mesh in FIG. 5, according to one embodiment.

FIG. 7 is an example of a level-of-detail mesh (or LOD) 700 corresponding to the polygonal mesh 500 in FIG. 5, according to one embodiment. As shown, the LOD 700 is a polygonal mesh that includes a smaller number of faces, edges, and vertices compared to the polygonal mesh 500 in FIG. 5. In some implementations, each sub-mesh of the polygonal mesh 500 is simplified individually to generate the LOD 700. The LOD 700 can be used for graphics operations, such as rendering operations, to reduce a resource cost, where, for the case of mesh simplification, a smaller number of polygons in the mesh corresponds to a smaller resource cost. Using LOD 700 for graphics operations allows the polygonal mesh corresponding to the LOD 700 to be stored using less space and may allow a computing device to render the polygonal mesh more easily and may allow a computing device to use fewer computing resources (e.g., using less processing power, less memory, etc.) when rendering the polygonal mesh or to perform shadowing. As a result, the LOD 700 is less expensive to store, process, render, etc. As used herein, the term "resource cost" is used to refer to the cost of computing resources in terms of storage, processing, rendering, etc.

Figure 8:
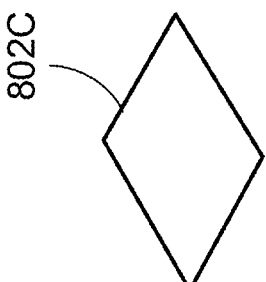
FIG. 8 is an example of a graphics mesh and multiple LODs for the graphics mesh, according to one embodiment.
Figure 8:
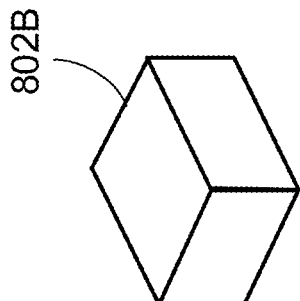
Figure 8:
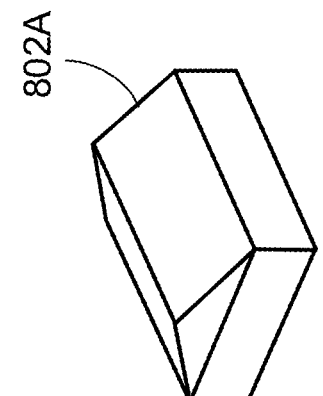
Figure 8:
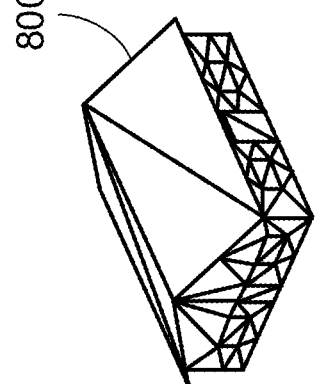

FIG. 8 is an example of a graphics mesh 800 and multiple LODs 802A, 802B, 802C for the graphics mesh, according to one embodiment. As shown, the graphics mesh 800 is a polygonal mesh. LODs 802A, 802B, 802C are also polygonal meshes, but with successively less polygons, where LOD 802A includes less polygons than the graphics mesh 800, LOD 802B includes less polygons than LOD 802A, and LOD 802C includes less polygons than LOD 802B. The embodiments disclosed herein can be configured to generate N LODs for the graphics mesh 800, where N is greater than or equal to 1. Each LOD of the N LODs may be constrained to a polygon budget. In some embodiments, a mesh simplification technique can be used to generate the LODs by selecting, for each component or sub-mesh of the graphics mesh 800, a version of the component that maximizes fidelity, while still constrained by the triangle budget for the LOD.

Stored Normals and Shading

In a polygonal mesh representing a 3D object, given a vertex in a polygonal face, a geometric normal, or normalized unit direction vector, can be computed representing the orientation of the face at that vertex. The normal can be computed as the cross-product of the directions of the pair of successive edges incident to that vertex, in the face, normalized to unit length.

The normals associated with face vertices are used during shading calculations that occur during rendering. In some implementations, when faces are non-triangular, the faces are triangulated prior to rendering. Each triangle is rendered independently, using the normals associated with its vertices.

Although geometric normals can readily be computed for meshes as needed, in practice it is common to store pre-computed normals on the mesh. Doing so allows explicit control over how models are shaded when rendered. The stored normals are used in place of directly computed geometric normals during rendering.

When a triangle is rendered, the stored normals at its three vertices are interpolated per-pixel across the triangle, using, for example, linear interpolation, and each pixel is shaded using the interpolated normal value at that pixel.

Figure 9:
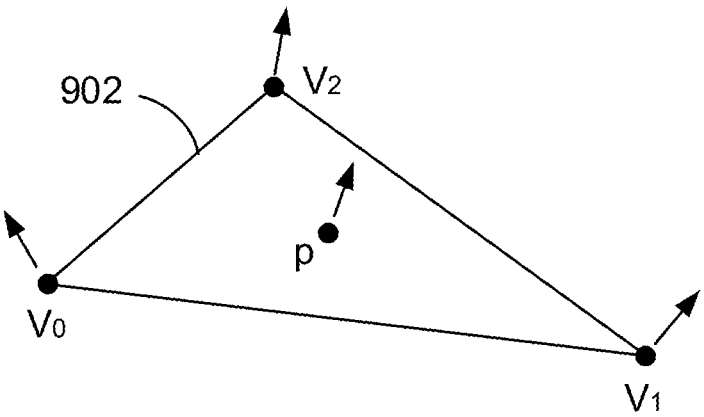
FIG. 9 is a conceptual diagram illustrating a face of a polygonal mesh, in one embodiment.

FIG. 9 is a conceptual diagram illustrating a face 902 of a polygonal mesh, in one embodiment. The face 902 includes vertices $v_0$, $v_1$ and $v_2$. In FIG. 9, the normals for the face 902 that are stored at the vertices v0, v1 and v2 are represented by directional arrows. To compute a normal for a point p in the face 902, the stored normals at the vertices v0, v1 and v2 are interpolated across the triangle.

Storing pre-computed normals allows the use of normal values that are independent from those calculated directly from the geometry. By precise control over the normals stored at face-vertices, it is possible to make the flat surfaces of rendered triangles appear curved. In practice, each triangle is flat, and only the normals vary. This interpolation of stored normals is useful for efficient rendering, in that storing normals allows a smooth curved surface to be convincingly approximated by relatively large mesh faces that only roughly approximate its smooth shape, in piece-wise-planar fashion.

Where the normals of the different faces at a vertex agree, the vertex is said to be "smooth-shaded." Conversely, where the normals at two adjacent face-vertices at the same vertex differ, the edge between them is said to be "hard-shaded" at the vertex. The visual effect of hard shading is of a crease or feature at the edge. In general, a single edge may be hard-shaded or smooth-shaded at each of its two vertices independently, depending on whether the normals of the adjacent face-vertices at each vertex agree or differ.

Figure 10:
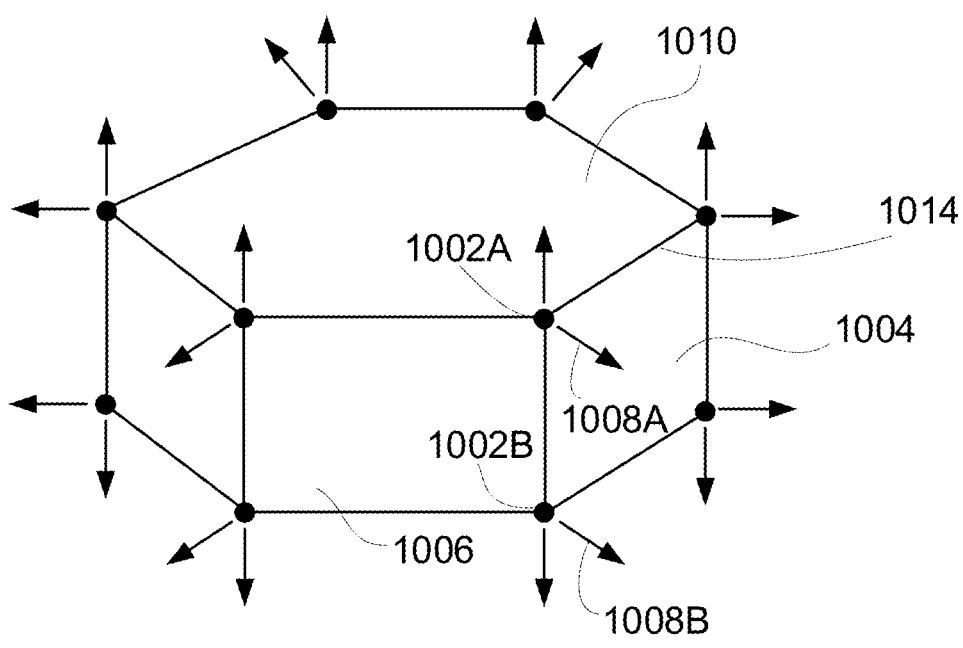
FIG. 10 is a conceptual diagram illustrating a 3D object, in one embodiment.

FIG. 10 is a conceptual diagram illustrating a 3D object, in one embodiment. FIG. 10 shows a cylinder approximated by a six-sided mesh with end caps. Because the mesh represents a cylinder, with smooth sides, we apply smooth-shaded normals to the edges between the vertical side faces. In the example shown, faces 1004 and 1006 are side faces of the cylinder and should be smooth shaded. This is represented in FIG. 10 at vertices 1002A and 1002B forming the edge between faces 1004 and 1006 by a single normal arrow 1008A and 1008B at each of vertices 1002A and 1002B, respectively.

By contrast, the edges between the sides and the end caps of the cylinder are hard-shaded. In the example shown, edge 1014 between side face 1004 and end cap face 1010 should be hard-shaded. This is represented in FIG. 10 at the vertices of edge 1014, where the face-vertex normals of the incident faces differ, at both of the vertices of edge 1014.
Bevels As used herein, "bevels" are a shading trick commonly used in artist-authored models of hard-surfaced objects like vehicles, weapons, and machinery. Bevels provide an efficient way to mimic the appearance of a soft edge between two relatively flat surfaces, at the expense of only a few extra faces.

Where two flat surfaces meet in a 3D model, they often meet at a hard-shaded edge. The visual impression is of a perfectly hard edge. Because real objects often have softer edges with a small amount of beveling, artists might wish to add extra detail at the edges and corners to approximate this soft, rounded edge. However, doing this naively can quickly add to the geometric cost of the mesh (i.e., increase the number of faces or triangles).

Instead, some embodiments can insert a single strip of narrow faces between the adjacent flat surfaces. These "bevel faces" have smooth-shaded edges and are assigned stored normals that match the geometric normals of the incident flat surfaces, so blending between these different normals over the width of the bevel face creates the impression of a curved surface.

Figure 11B:
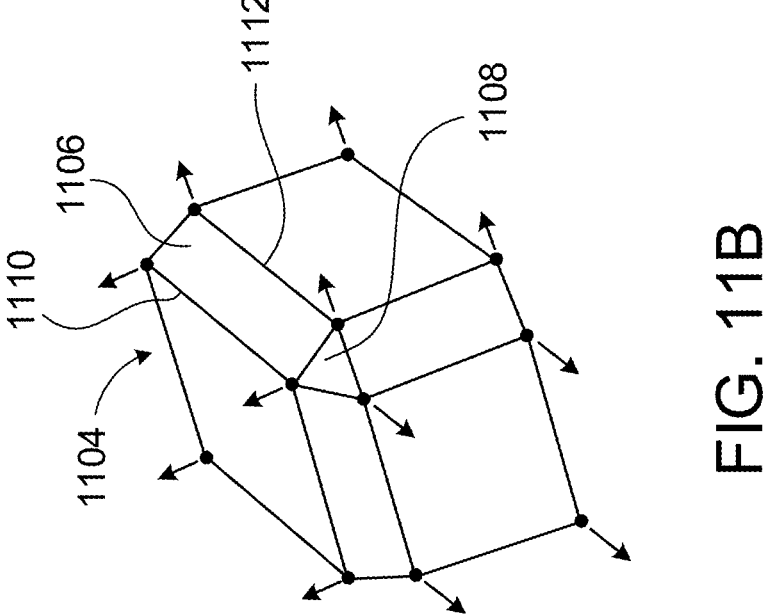
FIG. 11B is a conceptual diagram of a six-sided cube 1104 with added bevels, in one embodiment.
Figure 11A:
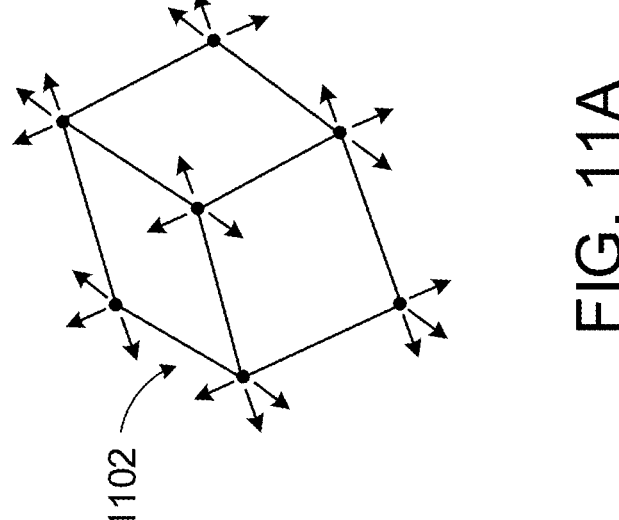
FIG. 11A is a conceptual diagram of a six-sided cube, in one embodiment.

FIG. 11A is a conceptual diagram of a six-sided cube 1102, in one embodiment. The cube 1102 has six large flat surfaces and can be approximated reasonably by a simple cubic mesh with just six square faces, as shown in FIG. 11A. In this simple representation, some embodiments might store identical normals at each of the four vertices of each face (or said another way, different normals in each of the three face-vertices incident to each vertex). The effect is to create the visual impression of a hard-surfaced box with sharp edges and corners.

FIG. 11B is a conceptual diagram of a six-sided cube 1104 with added bevels, in one embodiment. By adding bevels, some embodiments can create the impression of curved corners and edges at the expense of only a few extra faces, as shown FIG. 11B. A single narrow quad face 1106 is inserted along each edge, and a triangular face 1108 is inserted at each corner. The edges inserted between the existing quad faces (e.g., edges 1110, 1112) and the inserted bevel faces (e.g., face 1106) are smooth-shaded, and their normals match the geometric normals of the incident faces of the original cube (i.e., cube 1102 in FIG. 11A). By controlling the normals, embodiments of the disclosure limit the appearance of curvature to the bevel faces on the edges and corners, where the high normal curvature (i.e., change in normal angle) over a small area creates the impression of a curved surface in the shaded image along the bevel face 1106.

As described, a bevel is where a narrow "bevel face" with high normal curvature is inserted between two adjacent relatively flat surfaces with low normal curvature. The edges inserted between the bevel face and the adjacent flat faces are called "bevel edges." Because bevel faces are long narrow faces along the edges of larger faces, they are often quads. However, in some embodiments, bevel faces can have a shape other than a quad. For example, where two quad bevels meet, they are often separated by a triangular face 1108, as shown in FIG. 11B.
Detecting Bevels Bevels are a quite specific feature of artist-authored meshes, and do not generally occur in models produced automatically, e.g., by 3D sampling. Where bevels occur, they are modelled intentionally by the artist. Still, this information is not usually available to the mesh simplification tool. As a result, conventional LOD generations tools that rely on mesh simplification often introduce artifacts when simplifying meshes that includes bevels.

In one embodiment, an artist can introduce a bevel at a given edge by selecting the edge and requesting the graphics application to introduce a bevel at the edge. In one implementation, the bevel edges introduced by the beveling operation are stored in a list of bevel edges. The list of bevel edges can then be used when simplifying the mesh to avoid introducing artifacts, as described in greater detail herein.

In other embodiments, a mesh to be simplified that includes bevel includes no information about whether any bevels are included in the mesh. Accordingly, some embodiments of the disclosure provide a system and method that is able to recognize bevels automatically in a mesh using simple rules and subsequently generate LODs based on this bevel information without introducing artifacts.

Because a bevel is essentially just an extra face inserted to create the appearance of a curved corner between two flat surfaces (or at the edge of a single flat surface), a fundamental characteristic of a bevel face is that the bevel face is typically significantly smaller than the larger surface next to the bevel face, with significantly higher normal curvature (i.e., angle between the normals at opposite sides).

Figure 12:
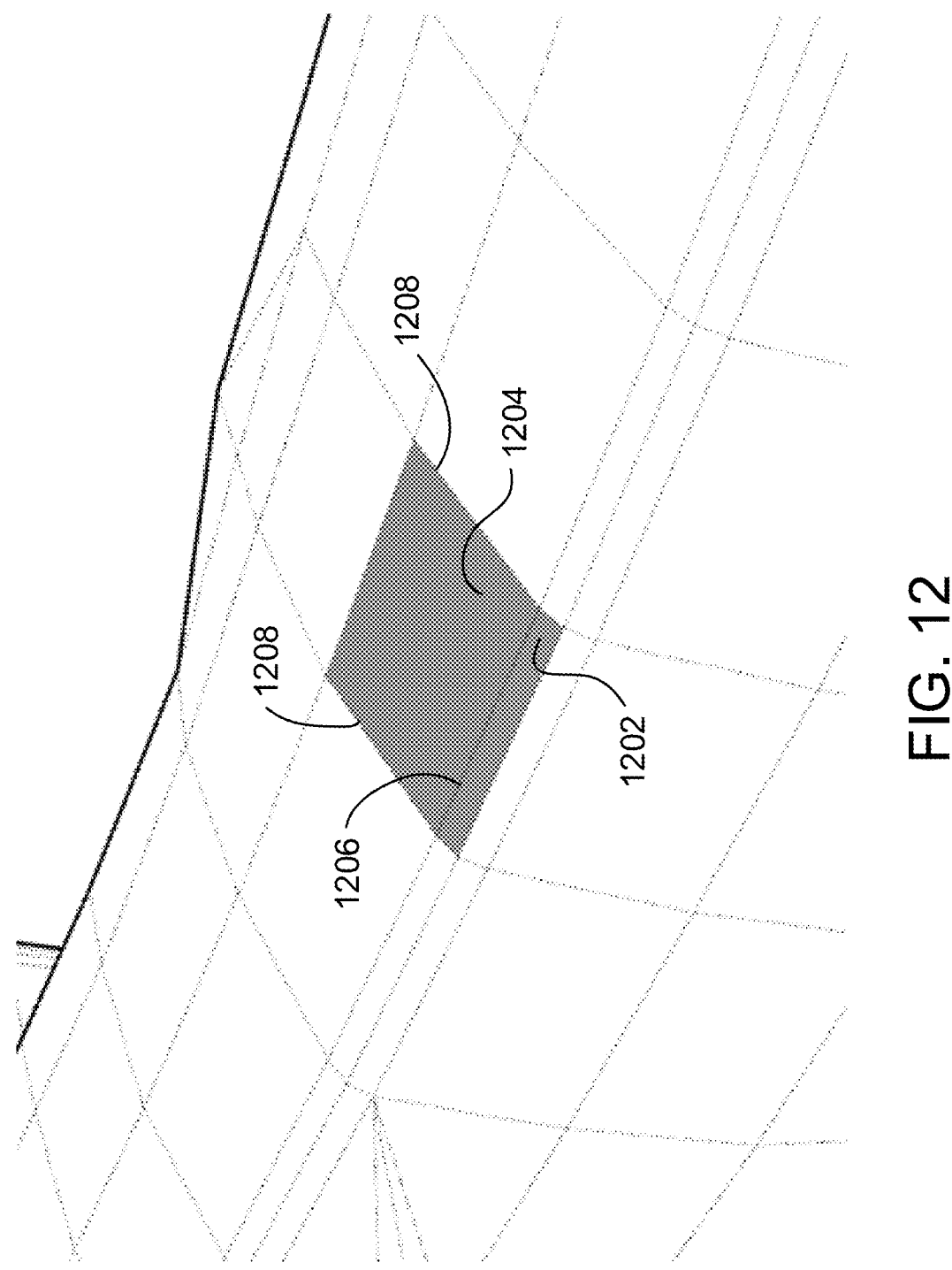
FIG. 12 is a conceptual diagram illustrating a bevel face and its adjacent flat face separated by a bevel edge, in one embodiment.

FIG. 12 is a conceptual diagram illustrating a bevel face 1202 and its adjacent flat face 1204 separated by a bevel edge 1206, in one embodiment. The example shown in FIG. 12 is of a car bumper model. One disclosed embodiment for detecting bevel edges is to look for edges that separate pairs of adjacent faces, where one face is small and has high normal curvature, and the other face is larger and has low normal curvature. In some embodiments, boundary edges with only one incident face are not considered bevel edges, so can be rejected.

Another characteristic of bevels is that the bevel edge is typically smooth-shaded. After all, the point of a bevel is to introduce a smoothly curved edge to a flat surface, so there is little point in creating a hard edge between the flat surface and the bevel. Moreover, if the bevel edge was already hard-shaded then there is no need to re-introduce a hard edge when the bevel is collapsed. Therefore, edges that are not smooth shaded are not candidates, and can be rejected.

In some embodiments, detection of bevel edges is based mainly on comparison of estimates of the normal curvatures and extents of the incident faces. Since faces are not generally regular quads, different measurements of normal curvature and face extent can be made at different vertices of the face. One embodiment takes measurements at two "wing vertices" in each face. Wing vertices are the vertices that are connected to the candidate bevel edge by the "wing edges" that are just the next and previous edge in each face. In FIG. 12, edges 1208 are the wing edges of bevel edge 1206. In some cases, the wing vertices are just the other two vertices in the face (for quads) or a common vertex (for triangles).

Some embodiments estimate the extent of each incident face by computing the distances of the two wing vertices in that face from the line of the candidate edge. This produces two "wing extents" in each face. Some embodiments take their average to calculate a single estimated "mean extent" for each face.

Then, the normal curvature of each incident face is estimated by computing the signed angles between the stored normals at each of the vertices of the candidate edge and the stored normals at the corresponding wing vertices in that face. The angles are measured around an axis that is just the candidate bevel edge. Again, this produces two wing curvature angles in each face. Again, some embodiments take the average of the two wing curvature angles to calculate a single estimated "curvature angle" for each face.

Expecting the flat face at a bevel edge to be wider than the bevel face, some embodiments reject candidate edges as bevel edges where the mean extent of one face is not at least some multiple of the mean extent of the other.

Expecting bevel faces to have higher normal curvature than the adjacent flat faces, some embodiments reject candidate edges as bevel edges where the absolute rate of normal curvature of the face with smaller mean extent is not at least some multiple of the absolute rate of normal curvature of the larger face. The rate of normal curvature of each face is its mean normal curvature angle divided by its mean extent.

In order to reject edges where neither incident face has significant normal curvature, some embodiments also reject candidate edges where the absolute mean normal curvature angle of the small face is below a minimum threshold angle.

Figure 13:
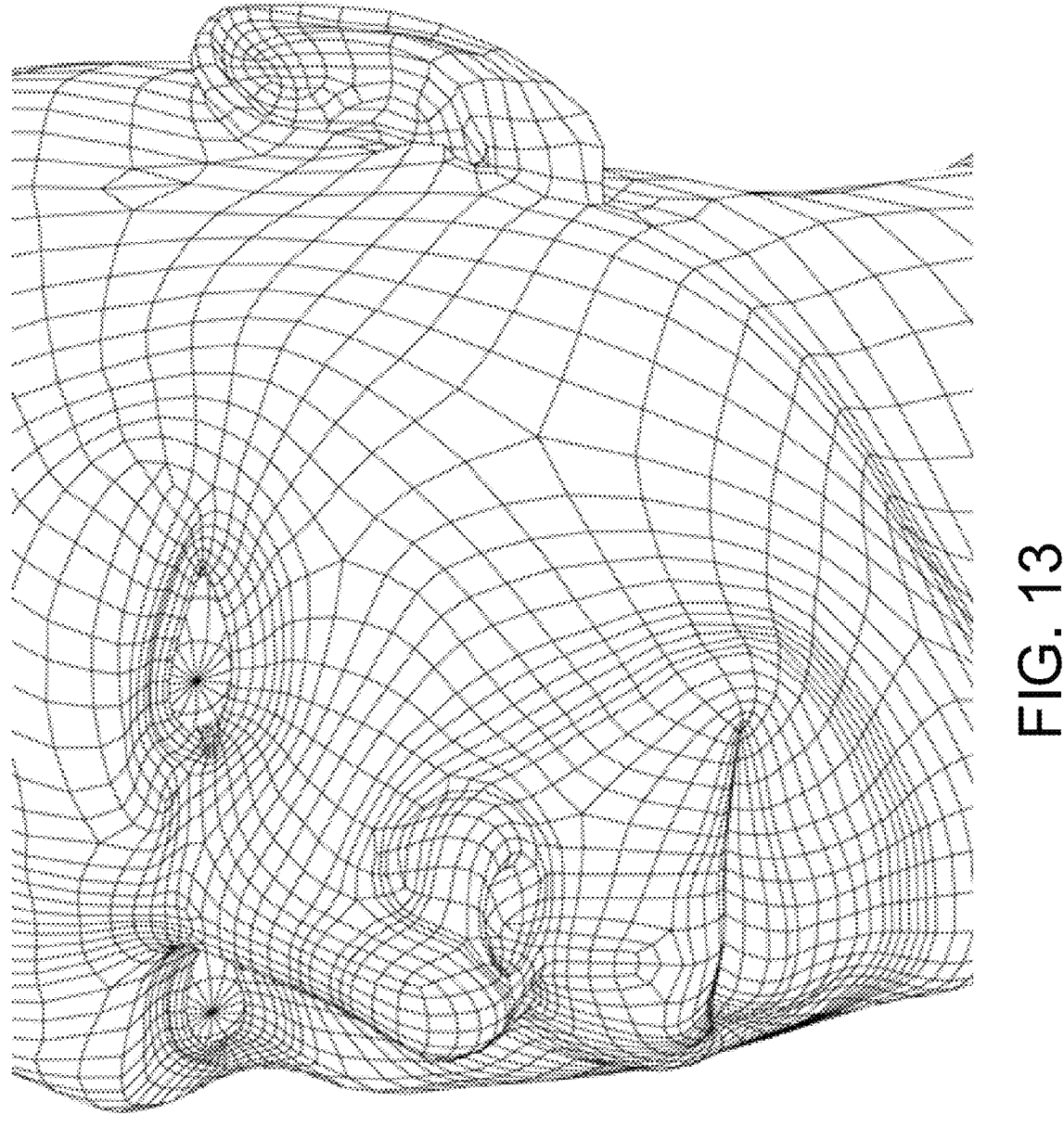
FIG. 13 is a conceptual diagram of a character mesh, in one embodiment.

In some embodiments, these filtering operations, with suitable thresholds, serve to identify most real bevels. However, in some cases, a non-bevel edge can be misidentified as a bevel edge. This can occur, for example, in semi-regular character meshes, like the mesh shown in FIG. 13, where pairs of adjacent quads may sometimes happen to exhibit the required characteristics; namely, a small face with high normal curvature adjacent to a larger face with much lower normal curvature.

In order to distinguish real but marginal bevels from red herrings (i.e., non-bevel edges), some embodiments make use of another observed characteristic of artist-authored bevels, namely that bevel edges often tend to be fairly regular.

Expecting bevel faces to have roughly constant width along their lengths, some embodiments reject candidate edges as bevel edges when the wing extents of the smaller incident face differ by more than a certain threshold factor. Also, expecting bevel faces to have roughly constant normal curvature along their lengths, some embodiments reject candidate edges at which the wing curvature angles of the smaller face differ by more than a threshold angle. To account for difference in extent at the two wing vertices, some embodiments normalize the wing angles to the extent of one wing (for example, picked arbitrarily) before comparing them.

Although the framework of thresholds described above serves to characterize bevels quite well, some embodiments additionally use a suite of different patterns, or templates, aimed at capturing progressively less regular bevels. Essentially, these embodiments are more tolerant of smaller differences in size and normal curvature (between the bevel and flat face) in cases where the sheer regularity of the bevel face suggests strongly that it is a bevel face. Some implementations use four or any number of different patterns, ranging from one that detects generic bevels (where the clear difference in size and normal curvature of the incident faces means they are very likely to be a bevel, no matter how irregular) to one for very regular bevels (where the regularity of the bevel face means we can tolerate smaller differences in normal curvature and size).

Edge Collapse

Figures 14A, 14B, 15A, 15B, 15C:
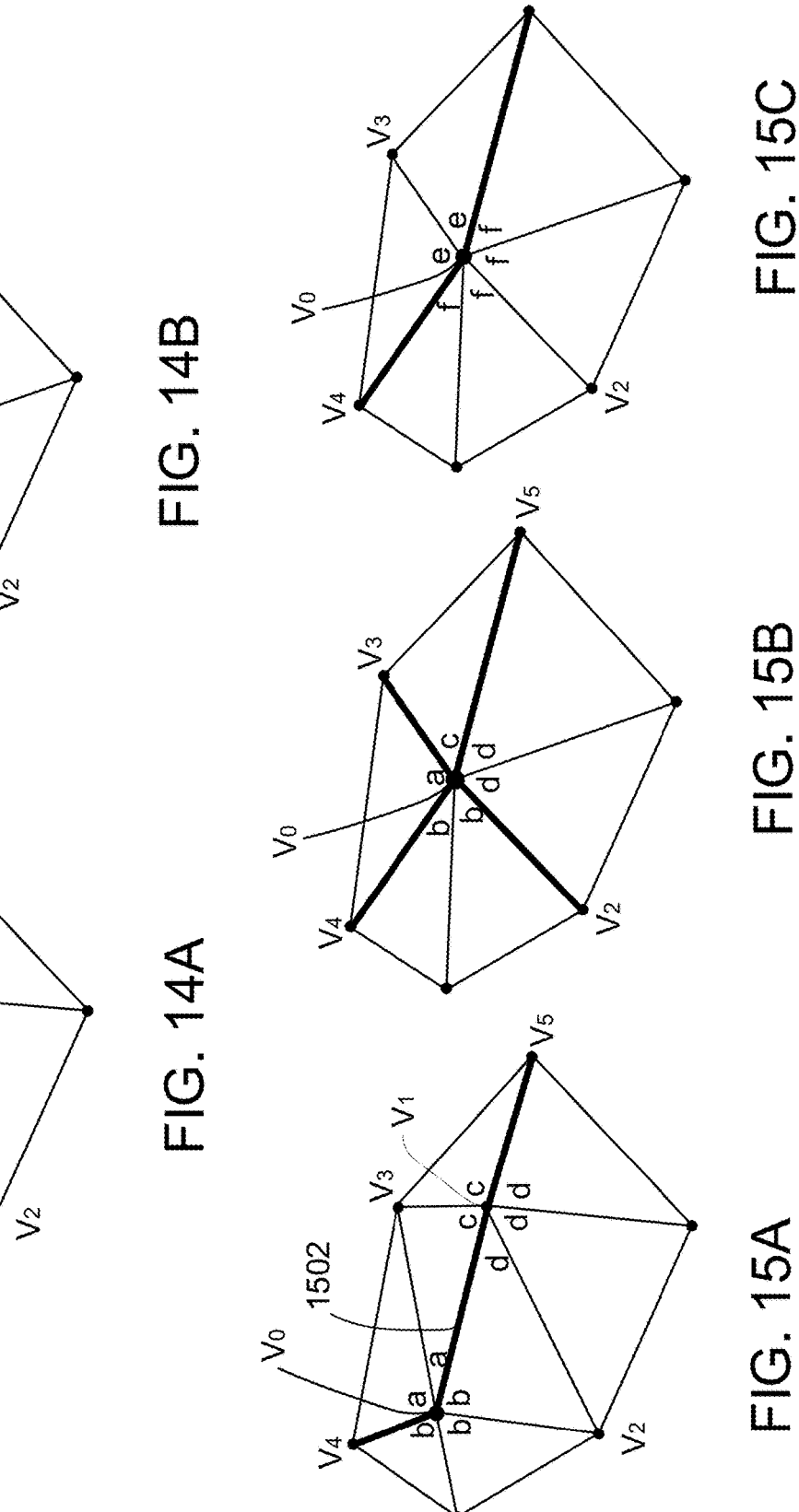
FIG. 14A is a conceptual diagram illustrating a portion of a polygonal mesh to be simplified using edge collapse, in one embodiment.
FIG. 14B is a conceptual diagram illustrating the portion of the polygonal mesh in FIG. 14A after edge collapse, in one embodiment.
FIGS. 15A-15C illustrate mesh simplification using edge collapse, in one embodiment.

Some disclosed embodiments for generating simplified versions of meshes use a technique called edge collapse. FIG. 14A is a conceptual diagram illustrating a portion of a polygonal mesh to be simplified using edge collapse, in one embodiment. In the example, suppose edge 1402 is identified for collapse, where the edge 1402 included vertices $v_0$ and $v_1$. Applying edge collapse to the edge 1402 replaces its two vertices $v_0$ and $v_1$ with just the single collapse vertex, as shown in FIG. 14B. In some embodiments, one of the two vertices the edge 1402 is selected arbitrarily as the collapse vertex and the other vertex is removed. In the example in FIG. 14B, vertex $v_1$ is removed, and the vertex $v_0$ is selected as the collapse vertex and moved to a collapse point chosen to optimize the approximation of the original geometry around the collapsed edge.

In some implementations, the collapse of the edge 1402 with vertices $v_0$ and $v_1$ can be implemented as a weld operator that replaces any reference to either $v_0$ or $v_1$ (for generality) with a reference to just $v_0$. Application of the weld mapping ($v_0{\rightarrow}v_0$, $v_1{\rightarrow}v_0$) results in the wing faces (i.e., the faces represented by vertex set ($v_0$, $v_1$, $v_3$) and vertex set ($v_1$, $v_0$, $v_2$) in FIG. 14A), which reference both $v_0$ and $v_1$, referencing $v_0$ twice in succession. A clean-up step detects and removes any successive references to the same vertex in a remapped face. The removal of the extra successive references has the effect of reducing the number of vertices in the face. Any faces that degenerate to two or less vertices can be discarded.

US 12,626,466 B2

13

Blending of Normals Around Collapsed Edges

When edges are collapsed, the stored normals of the vertices of the collapsed edges are updated. Failure to update the stored normals would tend to introduce unwanted hard-shaded edges, where faces with different normals are made adjacent by the collapse.

FIG. 15A illustrates a portion of a polygonal mesh with vertices $v_0$, $v_1$, $v_2$, $v_3$, $v_4$, $v_5$. A collapse edge 1502 represented by the vertex set $(v_0, v_1)$ is collapsed to just the vertex $v_0$, as shown in FIG. 15B and FIG. 15C. The face-vertices around vertex $v_0$ in FIG. 15A have two different normal values, indicated by a and b in FIG. 15A. The normals differ across edges $(v_0, v_1)$ and $(v_0, v_4)$, making those edges hard-shaded at $v_0$ (where hard shaded edges are shown in bold lines). Likewise the face-vertices around $v_1$ have two different normal values c and d in FIG. 15A, and the edges $(v_1, v_0)$ and $(v_1, v_5)$ are hard-shaded at $v_1$. Note that entire edges are drawn bold for simplicity, even though the notion of hardness of an edge is local to a vertex. For example edge $(v_0, v_4)$ is hard at $v_0$, but not necessarily at $v_4$.

After collapse of edge 1502 represented by the vertex set $(v_0, v_1)$, the newly created edge $(v_0, v_3)$ in FIG. 15B and FIG. 15C replaces the triangle $(v_0, v_1, v_3)$ in FIG. 15A and merges the existing edges $(v_0, v_3)$ and $(v_1, v_3)$ in FIG. 15A into edge $(v_0, v_3)$ in FIG. 15B. If no action is taken to blend normals, edge $(v_0, v_3)$ would become hard-shaded at $v_0$, as shown in FIG. 15B, separating faces with different normal values a and c. Likewise edge $(v_0, v_2)$ would be hard-shaded at $v_0$, separating faces with normal values b and d. Effectively, the collapse would have introduced two unwanted hard edges $(v_0, v_3)$ and $(v_0, v_2)$, drawn in bold in FIG. 15B.

Accordingly, some embodiments of the disclosure average, or blend, the normals around the collapse vertex after an edge collapse. One embodiment can simply average the stored normals around each collapse vertex after collapse. For example, at collapse vertex $v_0$ that remains after collapse of $(v_0, v_1)$, some embodiments sum the stored normals of its incident face-vertices (optionally with some weighting), re-normalize the sum, and then assign the normalized mean to all the incident face-vertices, replacing their stored normals with a single value and making the collapse vertex smooth-shaded. However, doing so would lose any pre-existing hard edges that were incident to the vertices of the collapse edge prior to the collapse. Specifically, edges $(v_0, v_4)$ and $(v_0, v_5)$ would no longer be hard at $v_0$.

To solve this problem, some embodiments of the disclosure first detect any existing hard edges incident to the vertices of the collapse edge before collapse, add them to a list, and use the list to limit the averaging of normals around the collapse vertex after collapse. Each of the edges incident to each vertex of the collapse edge before collapse is examined. If an incident edge is hard-shaded at that vertex prior to collapse (i.e. if the stored normals differ) then we record it as an ordered vertex pair pairing the collapse edge vertex with the other vertex of the hard edge. In FIG. 15A above, we find ordered vertex pairs $(v_0, v_1)$, $(v_0, v_4)$, $(v_1, v_0)$, and $(v_1, v_5)$.

The vertices of the pairs are remapped using the remapping of the weld operator that will perform the collapse, effectively translating the pairs to the corresponding vertices after collapse. Considering FIG. 15A, we remap the pairs to $(v_0, v_0)$, $(v_0, v_4)$, $(v_0, v_0)$, and $(v_0, v_5)$. Discarding the degenerate pairs $(v_0, v_0)$ and $(v_0, v_0)$, we add the remaining remapped pairs $(v_0, v_4)$, and $(v_0, v_5)$ to the accumulated list.

Then, when averaging the normals around the collapse vertex after collapse, some embodiments check whether any of its incident edges are designated hard-shaded by an ordered pair in the list of remapped vertex pairs. In FIG. 15C above, we find pairs $(v_0, v_4)$ and $(v_0, v_5)$, so deduce that edges $(v_0, v_4)$ and $(v_0, v_5)$ are hard at the collapse vertex $v_0$.

When averaging the ring of face-vertex normals around each collapse vertex, we partition the incident face-vertices into disjoint groups by cutting the ring at edges which are known to be hard-shaded at the vertex, and also at any edges which are boundary (incident to only one face). We average the normals of each group separately. Given a group of successive face-vertices around the collapse vertex, we sum the existing normals of the face-vertices, re-normalize the sum, and then assign the result to all of the face-vertices in the group. In FIG. 15C, we assign new computed normals e and f, where e is a normalized blend of a and c, and f is a normalized blend of b and d.

In some embodiments, in the case where only one incident edge is found to be hard at a non-boundary collapse vertex, its ring of incident face-vertices is only cut once and so still forms just one group. To ensure that stray hard edges are not lost, some embodiments select a second edge to harden at the vertex, ensuring there are at least two cuts and hence two disjoint groups. One implementation selects the edge with greatest geometric (dihedral) angle at the vertex.

Polychord Collapse

In traditional edge collapse, a single edge is collapsed in each step. Collapsing a single edge at each step is best suited to triangle meshes. Collapsing an edge in a triangular surface neatly removes that edge and the (up to) two incident triangles.

The disclosed embodiments are also configured to handle artist-authored meshes that are a mix of triangular faces, four-sided quad faces, and a faces of other degree. A particular use-case is character models, which are typically authored as semi-regular quad meshes. These typically have significant areas of regular grid-like quad topology, plus some selective use of triangles and vertices with less than four, or more than four, incident faces.

Figures 16A, 16B, 16C:
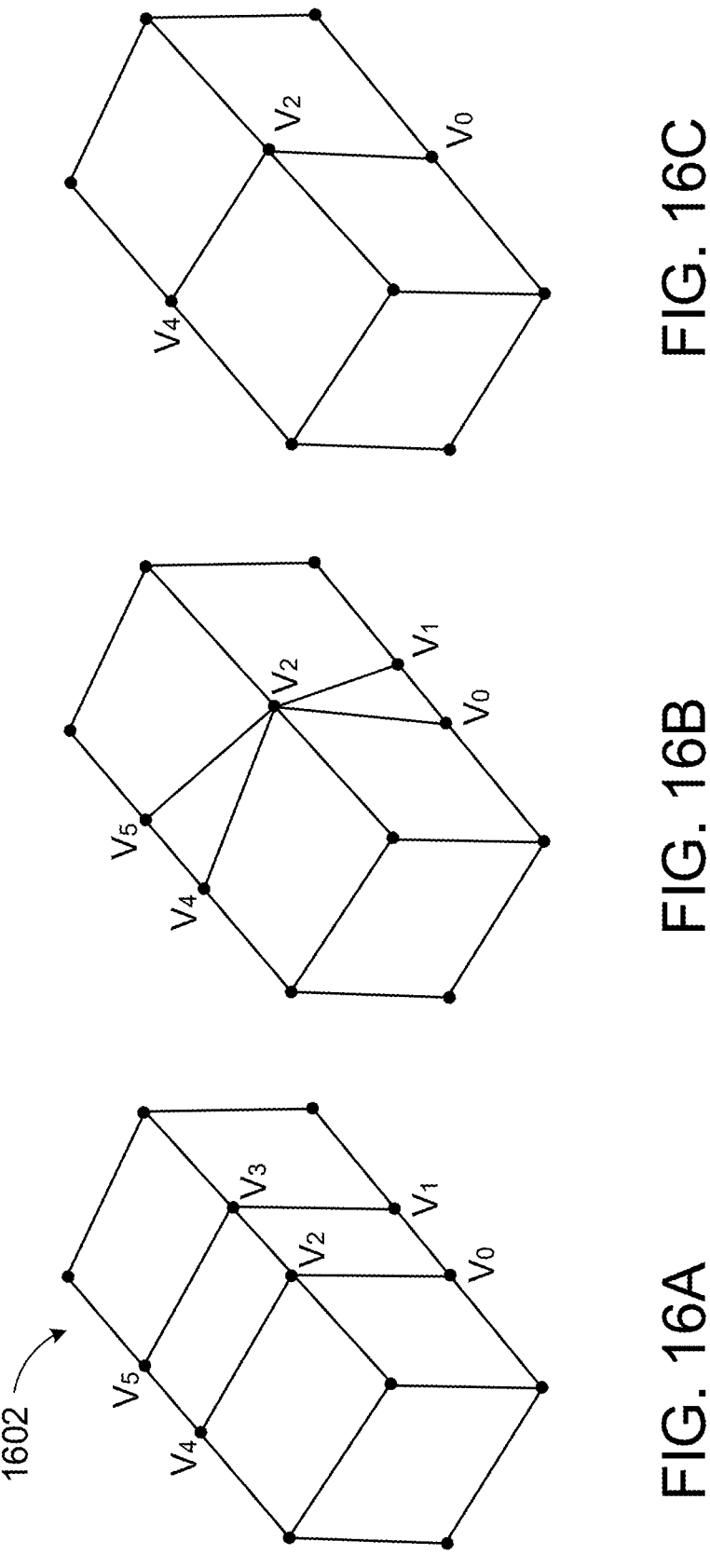
FIGS. 16A-16C illustrate mesh simplification using polychord edge collapse, in one embodiment.

When a single edge is collapsed in an area of regular quad topology, it tends to break the regularity, introducing unwanted triangles and singular vertices, as illustrated in FIGS. 16A-16C.

FIG. 16A illustrates a quad mesh 1602 including vertices $v_0$, $v_1$, $v_2$, $v_3$, $v_4$, $v_5$. The quad mesh 1602 has quad faces in a regular grid topology. Collapsing just the single edge, such as edge $(v_2, v_3)$, causes corruption of the regular topology and introduces two triangles and a singular vertex $v_2$ incident to six faces, as shown in FIG. 16B. This can be avoided if multiple edges are collapsed at once instead, as shown in FIG. 16C. In particular, some embodiments collapse the set of edges $(v_0, v_1)$, $(v_2, v_3)$, and $(v_4, v_5)$ (plus another hidden edge on the other side of the mesh, not shown), that separate the faces of an entire quad strip, so collapse the entire strip of quad faces at once. This cleanly removes the quad strip from the mesh and often makes the quad mesh topology more regular rather than less.

As such, embodiments of the disclosure allow for the collapse of polychords, which in general are just arbitrary sets of edges, where a chord is the dual of an edge, in the dual of the mesh. Although embodiments of the disclosure support arbitrary sets for generality, in practice the aim is to collapse carefully chosen linear sequences of edges in which each pair of successive edges are opposite edges of a single quad face. In FIG. 16A, edges $(v_0, v_1)$ and $(v_2, v_3)$ are opposite edges in the quad $(v_0, v_1, v_3, v_2)$. Traditional edge collapse can be thought of as a special case in which the polychord set contains exactly one edge, separating two triangles.

When a polychord is collapsed, all of its edges are collapsed together, in a single atomic collapse operation. The collapse can be implemented again by a generalized weld operator that replaces vertices with other vertices. We group the edges of the polychord into "islands," where the edges in each island are connected by shared vertices, and edges in different islands are unconnected. The weld operator then collapses each island of edges to a single vertex by replacing references to any of the vertices of the island with one vertex picked arbitrarily. Given an island of edges with vertices $v_0$, $v_1$, $v_2$, . . . , $v_n$, the weld operator replaces any reference to any of those vertices with a reference to just $v_0$.

As with single edge collapse, any successive references to the same vertex in the same face are removed, and any faces that degenerate to two vertices or less can be discarded. Degenerate polychord collapses can produce "pinched" faces with more than one non-consecutive reference to the same vertex. These collapses are detected and disallowed.

Blending of Normals Around Collapsed Polychords

Just as some embodiments of the disclosure update the normals around the collapse vertex following a single edge collapse, some embodiments of the disclosure update the normals around the collapse vertices of a polychord after a polychord collapse.

Recall that each island of connected edges in a polychord is collapsed to a single collapse vertex. The process of identifying existing hard edges around vertices, remembering them as ordered vertex pairs remapped by the weld operator, and then cutting the rings of face-vertices around the collapse vertex, can readily be generalized to islands.

Figures 17A, 17B, 18A, 18B:
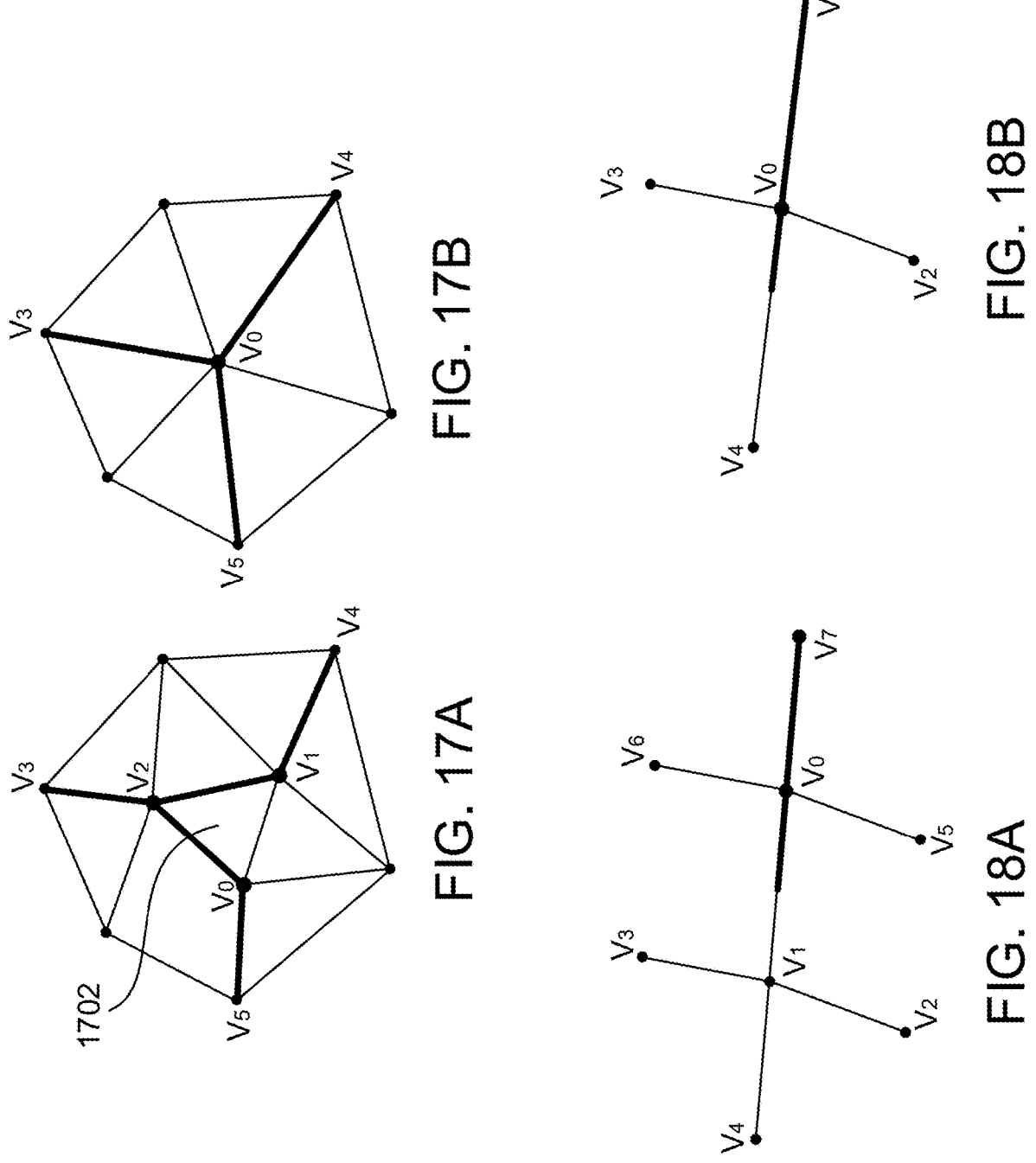
FIGS. 17A-17B illustrate mesh simplification using polychord edge collapse, in one embodiment.
FIGS. 18A-18B illustrate mesh simplification using polychord edge collapse, in one embodiment.

In FIG. 17A, a polygonal mesh is shown having vertices $v_0$, $v_1$, $v_2$, $v_3$, $v_4$, $v_5$. The island 1702 of two edges $(v_0, v_1)$ and $(v_1, v_2)$ in FIG. 17A is collapsed to just vertex $v_0$ in FIG. 17B by a polychord collapse. Existing hard edges at the vertices $v_0$, $v_1$ and $v_2$ of the island are identified, as drawn in bold lines in FIG. 17A. A list of ordered vertex pairs $(v_0, v_2)$, $(v_0, v_5)$, $(v_1, v_2)$, $(v_1, v_4)$, $(v_2, v_0)$, $(v_2, v_1)$, $(v_2, v_3)$ is identified for hard shaded edges. Remapping the pairs with the mapping of the weld operator, results in remapped pairs $(v_0, v_0)$, $(v_0, v_5)$, $(v_0, v_0)$, $(v_0, v_4)$, $(v_0, v_0)$, $(v_0, v_0)$, $(v_0, v_3)$. Discarding degenerate pairs leaves vertex pairs $(v_0, v_5)$, $(v_0, v_4)$ and $(v_0, v_3)$. Then, when updating the normals after collapse, edges $(v_0, v_5)$, $(v_0, v_4)$ and $(v_0, v_3)$ are identified as hard edges at the collapse vertex $v_0$, as shown in FIG. 17B, and the incident face-vertices are renormalized in groups accordingly.

A special case occurs where one of the hard edges incident to an island vertex is itself a collapse edge. FIG. 18A shows a portion of mesh with vertices $v_0$, $v_1$, $v_2$, $v_3$, $v_4$, $v_5$, $v_6$, $v_7$. FIG. 18A shows patch of a mesh before collapse of edge $(v_0, v_1)$. Inspecting the edges around $v_0$, we find that the edge $(v_0, v_1)$ is hard-shaded at $v_0$ (i.e., the normals at $v_0$ in the two faces incident to the edge differ). The end of edge at $(v_0, v_1)$ known to be hard to $v_0$ is drawn in bold (i.e., a portion of the edge $(v_0, v_1)$ is bold). Since the hard edge $(v_0, v_1)$ is a collapse edge, it will be collapsed, and so lost from the mesh after collapse. In one embodiment, we search the edges around the other vertex $v_1$ of the collapse edge for another edge to harden in place of $(v_0, v_1)$. We do not consider the edges $(v_1, v_2)$ and $(v_1, v_3)$ immediately clockwise and counter-clockwise from $(v_0, v_1)$ around $v_1$, since these edges of the wing faces will be typically be welded by the collapse. Instead we consider only the edges beyond them, on the opposite side of $v_1$ from $v_0$.

If any of those candidate edges is either boundary or already hard-shaded, we pick one of them, e.g., at random. If none of them are, then we pick the edge with greatest geometric (dihedral) angle. In FIG. 18A above, we pick the only available edge $(v_1, v_4)$. We mark the picked edge as hard at $v_0$ by building a vertex pair $(v_1, v_4)$, remapping it to $(v_0, v_4)$, and adding it to the list. FIG. 18B shows the end of edge at $(v_0, v_4)$ known to be hard to $v_0$ drawn in bold (i.e., a portion of the edge $(v_0, v_4)$ is bold).

Specialized Blending of Normals at Collapsed Bevels

Because bevels represent a trick use of stored normals to achieve a quite specific shading effect, naïve blending of normals during polychord collapse can result in undesirable corruption of shading. Recalling the example of the cube in FIGS. 11A-11B, bevels were added to an initially simple six-sided cube representation, replacing the hard-shaded box edges with smooth-shaded bevel faces. Hence, when collapsing the bevel faces during simplification, embodiments of the disclosure re-introduce the hard edges that the bevel faces originally replaced. In this sense, bevels can be thought of as specialized smooth-shaded proxies for simple hard-shaded edges.

Figures 19A, 19B, 19C, 19D, 19E:
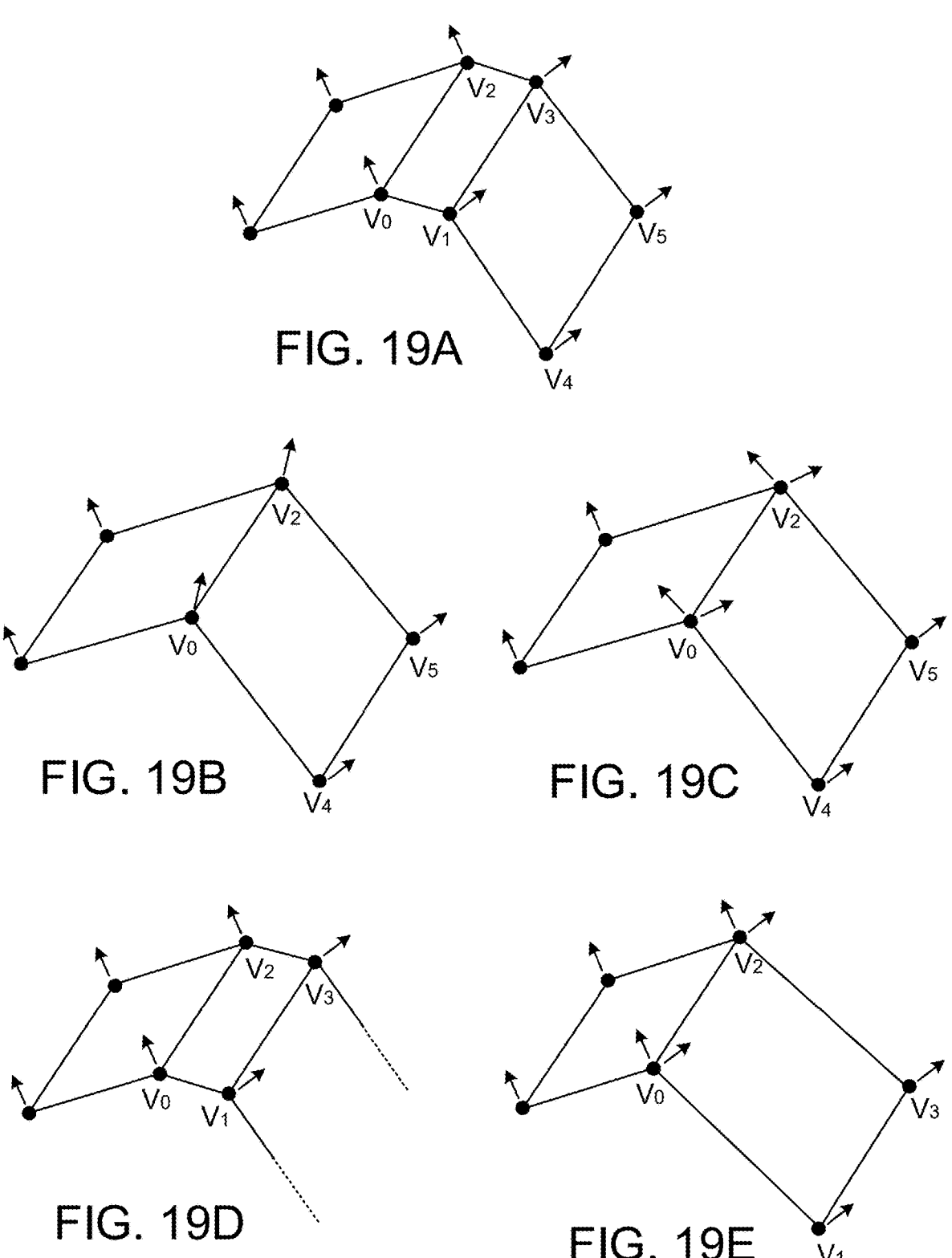
FIGS. 19A-19E illustrate mesh simplification using polychord edge collapse with preserving hard edges when a bevel is removed, in one embodiment.

As used herein, a bevel edge separates a thin bevel face with high normal curvature from a larger adjacent flat face with low normal curvature. FIG. 19A shows a bevel face $(v_0, v_1, v_3, v_2)$ and an adjacent flat face $(v_1, v_4, v_5, v_3)$, separated by a bevel edge $(v_1, v_3)$. The vertices of the bevel edge are smooth-shaded, and their normals are bent to match the geometric normals of the flat face, restricting the change in normal angle to the bevel face.

The bevel face $(v_0, v_1, v_3, v_2)$ can be collapsed by collapsing both of its short edges $(v_0, v_1)$ and $(v_2, v_3)$ in a single polychord collapse, as shown in FIG. 19B. The effect is to collapse the whole bevel face to a merged edge $(v_0, v_2)$, which merges the bevel edge $(v_1, v_3)$ and the opposite long edge $(v_0, v_2)$ in the original bevel face. Where previously the bevel edge separated the flat face from the high normal curvature across the bevel face, naïve blending of normals around the collapse vertices $v_0$ and $v_2$ may result in incorrect smooth-shaded normals on the merged edge $(v_0, v_2)$, as shown in FIG. 19B by a single normal arrow at each of vertices $v_0$ and $v_2$. These smooth-shaded normals will bleed normal curvature onto the adjacent flat face $(v_0, v_4, v_5, v_2)$, causing it to appear curved where previously it was flat-shaded, causing an artifact.

Although we take note of any existing hard-shaded edges incident to the vertices of the collapse edges prior to collapse, and harden the corresponding edges after collapse, in this case the merged edges are both smooth-shaded prior to collapse, so there is nothing to tell us that the merged edge should be hard-shaded. As such, embodiments of the disclosure recognize the bevel and actively reintroduce a hard edge, such as shown in FIG. 19C.

Since embodiments of the disclosure already build a list of all pre-existing edges incident to the vertex of the collapsed edges prior to collapse, and use this to re-harden edges during the blending of normals after collapse, some embodiments can simply add any edges we wish to explicitly harden to this list. Still, specialized logic is required to work out which edges need to be hardened. In some cases we also need to arrange to copy normals from some face-vertices to others prior to collapse, to ensure that the right normals remain on the faces that remain after collapse.

For simplicity, some embodiments perform no special handling for collapse edges that are bevel edges themselves. For each collapse edge that is not itself a bevel edge, we check whether it is incident to a bevel edge. Having identified that a certain collapse edge is incident to a bevel edge, we set about understanding how its collapse will impact the bevel. The collapse only impacts the bevel if the collapse edge is an edge of either the bevel face or the flat face.

In FIG. 19A, a collapse edge is incident to vertex $v_1$ of the bevel edge $(v_1, v_3)$. The collapse edge collapses the bevel face $(v_0, v_1, v_3, v_2)$ if the collapse edge is $(v_0, v_1)$, or the collapse edge collapses the adjacent flat face $(v_1, v_4, v_5, v_3)$ if the collapse edge is $(v_1, v_4)$. The handling differs depending on which face is collapsed.

If the collapse edge is in the bevel face then we need to harden the merged edge that will replace the collapsed bevel face. It is sufficient to harden the bevel edge. Given the collapse edge $(v_0, v_1)$ in FIG. 19A, we add a pair $(v_0, v_2)$ to the hard edge pair list, where $v_0$ and $v_2$ are the vertices to which the bevel edge vertices $v_1$ and $v_3$ are mapped by the collapse, respectively. This effectively hardens the bevel edge at $v_1$.

If the collapse edge is in the adjacent flat face, e.g., edge $(v_1, v_4)$ in FIG. 19A, then the correct handling depends on the location of the computed collapse point to which the collapse vertex is moved. If the collapse point is near the bevel edge, the effect is to collapse the flat face, stretching a neighboring face. This case is shown in FIG. 19D, where $(v_1, v_4)$ in FIG. 19A was collapsed to $v_1$ in FIG. 19D, near the bevel edge. In this case, the bevel face is left largely intact, and so we need not harden any edges.

On the other hand, if the collapse point is closer to the other end of the collapsed edge (i.e., closer to vertex $v_4$ than to vertex $v_1$), the effect is to stretch the bevel face to the point where it effectively replaces the flat face. This case is shown in FIG. 19E, where the collapse edge was again $(v_1, v_4)$ in FIG. 19A, but in this case was collapsed to a collapse point nearer $v_4$ in FIG. 19E. We can regard the bevel as being effectively removed, and replaced by the opposite edge $(v_0, v_2)$ in the bevel face. In this special case it is the opposite edge of the bevel face (i.e., edge $(v_0, v_2)$) that is hardened. We add a pair $(v_0, v_2)$ to the hard edge pair list, where $v_0$ and $v_2$ are the vertices to which the vertices $v_0$ and $v_2$ are mapped by the collapse, respectively. Vertex $v_0$ is the vertex in the bevel face connected by a single edge to vertex $v_1$, and vertex $v_2$ is the other vertex of the opposite edge.

Note that it in the first case, where the collapse edge is in the bevel face, it would also be valid to harden the opposite edge $(v_0, v_2)$ in the bevel face, which is the other edge merged to form the merged edge. Effectively, some embodiments could choose to harden the opposite edge $(v_0, v_2)$ in any case where the bevel is effectively removed.

In the latter case, where the collapse edge is not in the bevel face, the stored normal from vertex $v_1$ in flat face $(v_1, v_4, v_5, v_3)$ is copied to its opposite vertex $v_0$ in the bevel face $(v_0, v_1, v_3, v_2)$, before collapse. This is done because the bevel face effectively replaces the flat face, so needs the normals of the flat face at the new hard edge $(v_0, v_2)$. We add a pair of face-vertex pairs to an accumulated list, scheduling a copy of the stored normal from $v_1$ in face $(v_1, v_4, v_5, v_3)$ to $v_0$ in $(v_0, v_1, v_3, v_2)$. The actual copying of normals is done prior to collapse, but deferred until all potentially affected bevel edges have been inspected, so as not to prematurely overwrite the stored normals on the mesh.

Once all bevel edges have been inspected, one or more extra pairs may have been added to the list of ordered vertex pairs identifying hard edges denoting edges which require hardening due to removal of bevels. The list is then used to cut the rings of face-vertices around collapse vertices during blending and renormalizing of normals after collapse.

Marking Bevels

Although it may be simpler to detect bevels on the fly as polychords are collapsed, some embodiments identify all bevels once, at start of day on the original artist-authored model, before any collapses have occurred. In some cases, the bevels detected on the original artist-authored model are more likely to be real bevels than ones detected on the model once it has been altered by collapses. For example, if a bevel is found on the mesh after a number collapses, but would not have been found on the input mesh, it may be difficult to discern if this is really a bevel.

Detecting bevels on the original artist-authored model is also more efficient since to avoids re-examining every candidate incident edge for every collapse. It does, however, require us to remember which edges are bevel edges, and, of the two faces incident to the edge, which is the bevel face and which is the flat face. Even that cannot be reliably determined on the fly, since the geometry of the faces may have been altered by prior collapses.

Accordingly, some embodiments mark half-edges of the mesh as bevel instead of whole edges. Marking a half-edge as bevel indicates the orientation of the bevel at the edge: the face incident to the half-edge is the bevel face, and the face incident to the other half-edge in the edge is the adjacent flat face. Other embodiments might choose to explicitly store an indication of bevel orientation at each marked bevel edge.

In some embodiments, half-edges are marked with a pair of separate flags indicating whether they are bevel at their start and end vertices, respectively. Although our initial detection of bevels finds entire edges are either bevel edges or not, as collapses are processed we remove the marking of bevels at vertices where a bevel is collapsed by a collapse edge, and as a result edges may end up still being bevel at the one of their vertices but not at the other. Other embodiments are possible. For example, some embodiments might choose to mark individual face-vertices as bevel rather than ends of half-edges, since the two are equivalent.

The recording of bevels should withstand prior collapses, which alter the topology of the mesh. If an edge is labelled a bevel edge in the original mesh, it is still labelled a bevel edge later, even if the incident faces have been altered by prior collapses. When a face is removed and a replaced by an altered face (perhaps with fewer vertices) our mesh representation may assign new handles to the edges of the re-added face, even if they existed in some sense before.

When executing a polychord collapse, some embodiments temporarily store the flags of the half-edges potentially altered by the collapse, and re-apply them after the collapse. In such embodiments, we remember the half-edges with which remembered flag values are associated as ordered vertex pairs. The pairs are remapped using the vertex mapping of the weld operator, so that they can be resolved to pairs of vertices that still exist in the mesh after collapse. Flag values from different edges that map to the same half-edge in the collapsed mesh are merged by a bitwise union of the flag values. The effect is to class a half-edge that exists after collapse as bevel at its start or end vertex if any of the edges which were merged to form it were bevel at that vertex.

FIG. 20 is a flow diagram of method steps for simplifying a mesh including bevels, according to one embodiment. In various implementations, the method can be performed by the processor 110, the graphics processor 116, or a combination of the processor 110 and the graphics processor 116. In some embodiments, two or more steps shown in FIG. 20 may be performed by the same process or at the same time or in a different order.

As shown, the method begins at step 2002, where the processor receives a polygonal mesh representing a three-dimensional (3D) object. The polygonal mesh may be an artist-authored mesh. The artist may have used a graphics application to add bevels to the polygonal mesh. As described, a single strip of narrow faces can be inserted between the adjacent flat surfaces to form a bevel. These "bevel faces" have smooth-shaded edges and are assigned stored normals that match the geometric normals of the incident flat surfaces, so blending between these different normals over the width of the bevel face creates the impression of a curved surface.

At step 2004, the processor identifies a set of edges in the polygonal mesh as bevel edges.

In one embodiment, an artist can introduce a bevel at a given edge by selecting the edge and requesting the graphics application to introduce a bevel at the edge. In one implementation, the bevel edges introduced by the beveling operation are stored in a list of bevel edges. The list of bevel edges can then be used when simplifying the mesh to avoid introducing artifacts, as described in greater detail herein.

In other embodiments, a mesh to be simplified that includes bevel includes no information about whether any bevels are included in the mesh. Accordingly, some embodiments of the disclosure provide a system and method that is able to recognize bevels automatically in a mesh using simple rules.

In one embodiment, detecting bevels comprises identifying edges that separate pairs of adjacent faces, where one face is small and has high normal curvature, and the other face is larger and has low normal curvature. Some embodiments estimate the extent of each incident face of a candidate edge by computing the distances of the two wing vertices in that face from the line of the candidate edge. This produces two "wing extents" in each face. Some embodiments take their average to calculate a single estimated "mean extent" for each face.

Expecting the flat face at a bevel edge to be wider than the bevel face, some embodiments reject candidate edges as bevel edges where the mean extent of one face is not at least some multiple of the mean extent of the other.

Then, the normal curvature of each incident face is estimated by computing the signed angle between the stored normals at each of the vertices of the candidate edge and the corresponding wing vertices. The angles are measured around an axis that is just the candidate bevel edge. Again, this produces two wing curvature angles in each face. The average of the two wing curvature angles is computed to calculate a single estimated "curvature angle" for each face.

Expecting bevel faces to have higher normal curvature than the adjacent flat faces, some embodiments reject candidate edges as bevel edges where the absolute rate of normal curvature of the face with smaller mean extent is not at least some multiple of the absolute rate of normal curvature of the larger face. The rate of normal curvature of each face is its mean normal curvature angle divided by its mean extent. In order to reject edges where neither incident face has significant normal curvature, some embodiments also reject candidate edges where the absolute mean normal curvature angle of the small face is below a minimum threshold angle.

Additionally, in some embodiments, edges that are not smooth shaded are not candidates as bevel edges, and can be rejected.

At step 2006, the processor performs a mesh simplification operation on the polygonal mesh to generate a simplified mesh, where the mesh simplification operation removes at least one edge that includes a vertex that is of a bevel edge, and where two vertices in the polygonal mesh are collapsed to a collapse vertex in the simplified mesh.

In the example shown in FIG. 15A and FIG. 15C, a single edge is removed. The polygonal mesh in FIG. 15A is simplified to remove edge ($v_0$, $v_1$). Vertices $v_0$ and $v_1$ are collapsed to vertex $v_0$.

In the example shown in FIG. 19A and FIG. 19C, multiple edges are removed in a single operation. The polygonal mesh in FIG. 19A is simplified to remove edge ($v_0$, $v_1$) and edge ($v_2$, $v_3$). Vertices $v_0$ and $v_1$ are collapsed to vertex $v_0$. Vertices $v_3$ and $v_3$ are collapsed to vertex $v_3$.

At step 2008, the processor updates stored normals of the collapse vertex based on copying stored normals of the two vertices removed from the polygonal mesh to the collapse vertex. In one embodiment, the at least one edge removed from the polygonal mesh includes a first vertex and a second vertex.

In one embodiment, updating the stored normals of the collapse vertex comprises: connecting each vertex that is incident to either the first vertex or the second vertex by new edges to the collapse vertex; determining which of the new edges should be hard shaded based on the set of edges in the polygonal mesh identified as bevel edges; copying stored normals to each face incident to the collapse vertex in the simplified mesh from corresponding stored normals in the polygonal mesh; and averaging the stored normals of the faces incident to the collapse vertex in groups between hard shaded edges incident to the collapse vertex.

Referring to the example shown in FIG. 15A and FIG. 15C, the polygonal mesh in FIG. 15A is simplified to remove edge ($v_0$, $v_1$). Vertices $v_0$ and $v_1$ are collapsed to vertex $v_0$. Each of the vertices that previously was connected by an edge to either $v_0$ and $v_1$ in FIG. 15A is connected by a new edge to the collapse vertex $v_0$ in FIG. 15C. The stored normals from the original faces in FIG. 15A are copied to the faces in FIG. 15B. As shown, for any faces that were previously incident on vertex $v_1$ that remain in the simplified mesh are updated to refer to vertex $v_0$ instead of $v_1$. For example, face ($v_1$, $v_3$, $v_5$) having a face normal "c" is updated to face ($v_0$, $v_3$, $v_5$) the face normal "c" is copied to the updated face ($v_0$, $v_3$, $v_5$).

When averaging the ring of face-vertex normals around collapse vertex, we partition the incident face-vertices into disjoint groups by cutting the ring at edges which are known to be hard-shaded at the vertex. We average the normals of each group separately. Given a group of successive face-vertices around the collapse vertex, we sum the existing normals of the face-vertices, re-normalize the sum, and then assign the result to all of the face-vertices in the group. In FIG. 15C, we assign new computed normals e and f, where e is a normalized blend of a and c, and f is a normalized blend of b and d.

In one embodiment, a bevel face in the polygonal mesh comprises a first bevel edge, a second bevel edge, a third edge between a first vertex of the first bevel edge and a first vertex of the second bevel edge, and a fourth edge between a second vertex of the first bevel edge and a second vertex of the second bevel edge. The first bevel edge separates the bevel face from a first adjacent surface and the second bevel edge separates the bevel face from a second adjacent surface. Vertices of the first bevel edge are smooth shaded between the bevel face and the first adjacent surface and vertices of the second bevel edge are smooth shaded between the bevel face and the second adjacent surface.

In one embodiment, performing the mesh simplification operation on the polygonal mesh to generate the simplified mesh comprises removing the third edge and the fourth edge. The first vertex of the first bevel edge and the first vertex of the second bevel edge are collapsed to a first collapse vertex in the simplified mesh. The second vertex of the first bevel edge and the second vertex of the second bevel edge are collapsed to a second collapse vertex in the simplified mesh. Stored normals from the first vertex of the first bevel edge and stored normals from the first vertex of the second bevel edge are copied to the first collapse vertex. Stored normals from the second vertex of the first bevel edge and stored normals from the second vertex of the second bevel edge are copied to the second collapse vertex. The first collapse vertex is hard shaded after copying the stored normals from the first vertex of the first bevel edge and the first vertex of the second bevel edge to the first collapse vertex, and the second collapse vertex is hard shaded after copying the stored normals from the second vertex of the first bevel edge and the second vertex of the second bevel edge to the second collapse vertex.

Referring back to the example shown in FIG. 19A and FIG. 19C, multiple edges are removed in a single operation. The polygonal mesh in FIG. 19A is simplified to remove edge ($v_0$, $v_1$) and edge ($v_2$, $v_3$). Vertices $v_0$ and $v_1$ are collapsed to vertex $v_0$. Vertices $v_2$ and $v_3$ are collapsed to vertex $v_2$. As shown, the stored normals from vertices $v_0$ and $v_1$ and copied to collapse vertex $v_0$, and the stored normals from vertices $v_2$ and $v_3$ are copied to collapse vertex $v_2$. The resultant edge ($v_0$, $v_2$) arises from collapse of a bevel face, thus the face normals on opposite sides of the bevel edge form distinct group and are not averaged. Thus, the collapse vertices $v_0$ and $v_2$ are both hard shaded after the bevel face is removed.

As disclosed herein, embodiments of the disclosure provide an approach that extends the update of stored normals during edge collapse operations to detect and correctly handle the collapse of bevels. Correct update of normals around collapsed bevels selectively hardens specific edges to prevent the smooth normals of the bevel from bleeding onto nearby flat surfaces. The disclosed embodiments identify bevels in artist-authored models at start of day and record the identified bevels in a set of flags associated with half-edges of the mesh. Embodiments of the disclosure then store and update this flag-based recording of bevels as edges are collapsed.

In some embodiments, identification of bevels is based on a set of tolerances that can be tuned as parameters. In some implementations, correctly detecting bevels without introducing red herrings utilizes matching bevels with a suite of patterns, each using different parameters, targeted at bevels of different degrees of regularity.

The mesh simplification tool within which our bevel handling operates preserves the regular topology of semi-regular quad meshes by collapsing sets of related edges at once in a single operation called a polychord collapse. The approach described herein is polychord-aware and can update the normals around bevels collapsed by complex polychord collapses that collapse multiple edges at once.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for simplifying a mesh including bevels, the method comprising:
   receiving a polygonal mesh representing a three-dimensional (3D) object;
   identifying a set of edges in the polygonal mesh as bevel edges;

performing a mesh simplification operation on the polygonal mesh to generate a simplified mesh, wherein the mesh simplification operation removes at least one edge that includes a vertex that is of a bevel edge, and wherein two vertices in the polygonal mesh are collapsed to a collapse vertex in the simplified mesh; and updating stored normals of the collapse vertex based on copying stored normals of the two vertices removed from the polygonal mesh to the collapse vertex;

wherein identifying the set of edges in the polygonal mesh as bevel edges comprises:

identifying a candidate edge, wherein the candidate edge separates a first face and a second face;

determining that the first face has a mean extent that is at least a first threshold multiple of a mean extent of the second face;

determining that an absolute rate of normal curvature of the second face is at least a second threshold multiple of an absolute rate of normal curvature of the first face; and determining that the candidate edge is a bevel edge in the set of edges.

2. The method according to claim 1, wherein a mean extent of a given face is determined by computing distances of two wing vertices in the given face from a line of the candidate edge and calculating an average of the distances of the two wing vertices as the mean extent of the given face.

3. The method according to claim 1, wherein an absolute rate of normal curvature of a given face is a mean normal curvature angle of the given face divided by a mean extent of the given face.

4. The method according to claim 1, wherein a bevel face in the polygonal mesh comprises a first bevel edge, a second bevel edge, a third edge between a first vertex of the first bevel edge and a first vertex of the second bevel edge, and a fourth edge between a second vertex of the first bevel edge and a second vertex of the second bevel edge;

wherein the first bevel edge separates the bevel face from a first adjacent surface and the second bevel edge separates the bevel face from a second adjacent surface; and wherein vertices of the first bevel edge are smooth shaded between the bevel face and the first adjacent surface and vertices of the second bevel edge are smooth shaded between the bevel face and the second adjacent surface.

5. The method according to claim 4, wherein performing the mesh simplification operation on the polygonal mesh to generate the simplified mesh comprises removing the third edge and the fourth edge;

wherein the first vertex of the first bevel edge and the first vertex of the second bevel edge are collapsed to a first collapse vertex in the simplified mesh;

wherein the second vertex of the first bevel edge and the second vertex of the second bevel edge are collapsed to a second collapse vertex in the simplified mesh;

wherein stored normals from the first vertex of the first bevel edge and stored normals from the first vertex of the second bevel edge are copied to the first collapse vertex;

wherein stored normals from the second vertex of the first bevel edge and stored normals from the second vertex of the second bevel edge are copied to the second collapse vertex;

wherein the first collapse vertex is hard shaded after copying the stored normals from the first vertex of the first bevel edge and the first vertex of the second bevel edge to the first collapse vertex; and wherein the second collapse vertex is hard shaded after copying the stored normals from the second vertex of the first bevel edge and the second vertex of the second bevel edge to the second collapse vertex.

6. The method according to claim 5, wherein vertices of an edge that are hard shaded have different face-vertex normals on each side of the edge at the vertex; and wherein vertices of an edge that are smooth shaded have matching face-vertex normals on each side of the edge at the vertex.

7. The method according to claim 1, wherein the at least one edge removed from the polygonal mesh includes a first vertex and a second vertex;

wherein updating the stored normals of the collapse vertex comprises:

connecting each vertex that is incident to either the first vertex or the second vertex by new edges to the collapse vertex;

determining which of the new edges should be hard shaded based on the set of edges in the polygonal mesh identified as bevel edges;

copying stored normals to each face incident to the collapse vertex in the simplified mesh from corresponding stored normals in the polygonal mesh; and averaging the stored normals of the faces incident to the collapse vertex in groups between hard shaded edges incident to the collapse vertex.

8. A non-transitory computer-readable storage medium storing instructions that, when executed by one or more processors, causes a computing device to simplify a mesh including bevels, by performing the steps of:

receiving a polygonal mesh representing a three-dimensional (3D) object;

identifying a set of edges in the polygonal mesh as bevel edges;

performing a mesh simplification operation on the polygonal mesh to generate a simplified mesh, wherein the mesh simplification operation removes at least one edge that includes a vertex that is of a bevel edge, and wherein two vertices in the polygonal mesh are collapsed to a collapse vertex in the simplified mesh; and updating stored normals of the collapse vertex based on copying stored normals of the two vertices removed from the polygonal mesh to the collapse vertex;

wherein identifying the set of edges in the polygonal mesh as bevel edges comprises:

identifying a candidate edge, wherein the candidate edge separates a first face and a second face;

determining that the first face has a mean extent that is at least a first threshold multiple of a mean extent of the second face;

determining that an absolute rate of normal curvature of the second face is at least a second threshold multiple of an absolute rate of normal curvature of the first face; and determining that the candidate edge is a bevel edge in the set of edges.

9. The computer-readable storage medium according to claim 8, wherein a mean extent of a given face is determined by computing distances of two wing vertices in the given face from a line of the candidate edge and calculating an average of the distances of the two wing vertices as the mean extent of the given face.

10. The computer-readable storage medium according to claim 8, wherein an absolute rate of normal curvature of a given face is a mean normal curvature angle of the given face divided by a mean extent of the given face.

11. The computer-readable storage medium according to claim 8, wherein a bevel face in the polygonal mesh comprises a first bevel edge, a second bevel edge, a third edge between a first vertex of the first bevel edge and a first vertex of the second bevel edge, and a fourth edge between a second vertex of the first bevel edge and a second vertex of the second bevel edge;

wherein the first bevel edge separates the bevel face from a first adjacent surface and the second bevel edge separates the bevel face from a second adjacent surface; and wherein vertices of the first bevel edge are smooth shaded between the bevel face and the first adjacent surface and vertices of the second bevel edge are smooth shaded between the bevel face and the second adjacent surface.

12. The computer-readable storage medium according to claim 11, wherein performing the mesh simplification operation on the polygonal mesh to generate the simplified mesh comprises removing the third edge and the fourth edge;

wherein the first vertex of the first bevel edge and the first vertex of the second bevel edge are collapsed to a first collapse vertex in the simplified mesh;

wherein the second vertex of the first bevel edge and the second vertex of the second bevel edge are collapsed to a second collapse vertex in the simplified mesh;

wherein stored normals from the first vertex of the first bevel edge and stored normals from the first vertex of the second bevel edge are copied to the first collapse vertex;

wherein stored normals from the second vertex of the first bevel edge and stored normals from the second vertex of the second bevel edge are copied to the second collapse vertex;

wherein the first collapse vertex is hard shaded after copying the stored normals from the first vertex of the first bevel edge and the first vertex of the second bevel edge to the first collapse vertex; and wherein the second collapse vertex is hard shaded after copying the stored normals from the second vertex of the first bevel edge and the second vertex of the second bevel edge to the second collapse vertex.

13. The computer-readable storage medium according to claim 12, wherein vertices of an edge that are hard shaded have different face-vertex normals on each side of the edge at the vertex; and wherein vertices of an edge that are smooth shaded have matching face-vertex normals on each side of the edge at the vertex.

14. The computer-readable storage medium according to claim 8, wherein the at least one edge removed from the polygonal mesh includes a first vertex and a second vertex;

wherein updating the stored normals of the collapse vertex comprises:

connecting each vertex that is incident to either the first vertex or the second vertex by new edges to the collapse vertex;

determining which of the new edges should be hard shaded based on the set of edges in the polygonal mesh identified as bevel edges;

copying stored normals to each face incident to the collapse vertex in the simplified mesh from corresponding stored normals in the polygonal mesh; and averaging the stored normals of the faces incident to the collapse vertex in groups between hard shaded edges incident to the collapse vertex.

15. A device for simplifying a mesh including bevels, the device comprising:

a memory storing instructions; and one or more processors configured to the execute the instructions to cause the device to:

receive a polygonal mesh representing a three-dimensional (3D) object;

identify a set of edges in the polygonal mesh as bevel edges;

perform a mesh simplification operation on the polygonal mesh to generate a simplified mesh, wherein the mesh simplification operation removes at least one edge that includes a vertex that is of a bevel edge, and wherein two vertices in the polygonal mesh are collapsed to a collapse vertex in the simplified mesh; and update stored normals of the collapse vertex based on copying stored normals of the two vertices removed from the polygonal mesh to the collapse vertex;

wherein identifying the set of edges in the polygonal mesh as bevel edges comprises:

identifying a candidate edge, wherein the candidate edge separates a first face and a second face:

determining that the first face has a mean extent that is at least a first threshold multiple of a mean extent of the second face;

determining that an absolute rate of normal curvature of the second face is at least a second threshold multiple of an absolute rate of normal curvature of the first face; and determining that the candidate edge is a bevel edge in the set of edges.

16. The device according to claim 15, wherein a bevel face in the polygonal mesh comprises a first bevel edge, a second bevel edge, a third edge between a first vertex of the first bevel edge and a first vertex of the second bevel edge, and a fourth edge between a second vertex of the first bevel edge and a second vertex of the second bevel edge;

wherein the first bevel edge separates the bevel face from a first adjacent surface and the second bevel edge separates the bevel face from a second adjacent surface; and wherein vertices of the first bevel edge are smooth shaded between the bevel face and the first adjacent surface and vertices of the second bevel edge are smooth shaded between the bevel face and the second adjacent surface.

17. The device according to claim 16, wherein performing the mesh simplification operation on the polygonal mesh to generate the simplified mesh comprises removing the third edge and the fourth edge;

wherein the first vertex of the first bevel edge and the first vertex of the second bevel edge are collapsed to a first collapse vertex in the simplified mesh;

wherein the second vertex of the first bevel edge and the second vertex of the second bevel edge are collapsed to a second collapse vertex in the simplified mesh;

wherein stored normals from the first vertex of the first bevel edge and stored normals from the first vertex of the second bevel edge are copied to the first collapse vertex;

wherein stored normals from the second vertex of the first bevel edge and stored normals from the second vertex of the second bevel edge are copied to the second collapse vertex;

wherein the first collapse vertex is hard shaded after copying the stored normals from the first vertex of the first bevel edge and the first vertex of the second bevel edge to the first collapse vertex;

wherein the second collapse vertex is hard shaded after copying the stored normals from the second vertex of the first bevel edge and the second vertex of the second bevel edge to the second collapse vertex;

wherein vertices of an edge that are hard shaded have different face-vertex normals on each side of the edge at the vertex; and wherein vertices of an edge that are smooth shaded have matching face-vertex normals on each side of the edge at the vertex.

18. The device according to claim 15, wherein the at least one edge removed from the polygonal mesh includes a first vertex and a second vertex;

wherein updating the stored normals of the collapse vertex comprises:

connecting each vertex that is incident to either the first vertex or the second vertex by new edges to the collapse vertex;

determining which of the new edges should be hard shaded based on the set of edges in the polygonal mesh identified as bevel edges;

copying stored normals to each face incident to the collapse vertex in the simplified mesh from corresponding stored normals in the polygonal mesh; and averaging the stored normals of the faces incident to the collapse vertex in groups between hard shaded edges incident to the collapse vertex.

* * * * *